(12) United States Patent
Amundsen et al.

(10) Patent No.: US 7,386,397 B2
(45) Date of Patent: Jun. 10, 2008

(54) PROCESSING SEISMIC DATA

(75) Inventors: Lasse Amundsen, Trondheim (NO); Tage Rosten, Trondheim (NO); Johan O. A. Robertsson, Oslo (NO); Julian Edward Kragh, Finchingfield (GB)

(73) Assignee: WesternGeco L.L.C., Houston, TX (US)

( * ) Notice: Subject to any disclaimer, the term of this patent is extended or adjusted under 35 U.S.C. 154(b) by 0 days.

(21) Appl. No.: 10/514,858

(22) PCT Filed: May 27, 2003

(86) PCT No.: PCT/GB03/02305

§ 371 (c)(1),
(2), (4) Date: Jul. 21, 2005

(87) PCT Pub. No.: WO03/100461

PCT Pub. Date: Dec. 4, 2003

(65) Prior Publication Data

US 2006/0074562 A1    Apr. 6, 2006

(30) Foreign Application Priority Data

May 28, 2002    (GB) ................................ 0212293.5

(51) Int. Cl.
*G01V 1/00* (2006.01)
*G01V 1/38* (2006.01)
(52) U.S. Cl. ........................................ 702/14; 367/24
(58) Field of Classification Search .................. 702/14, 702/17–18; 367/15, 20–21, 24; 181/120, 181/122; 703/2, 5
See application file for complete search history.

(56) References Cited

U.S. PATENT DOCUMENTS 4,520,467 A    5/1985    Berni (Continued)

FOREIGN PATENT DOCUMENTS

GB    2 379 981 A    6/2001

(Continued)

OTHER PUBLICATIONS

Amundsen et al., Extraction of the Normal Component of the Particle Velocity from Marine Pressure Data, Jan.-Feb. 1995, Geophysics, vol. 60, No. 1, pp. 212-222.*

(Continued)

*Primary Examiner*—John E. Barlow, Jr.
*Assistant Examiner*—Toan M Le
(74) *Attorney, Agent, or Firm*—Liangang (Mark) Ye; Jeffrey E. Griffin

(57) ABSTRACT

A method of determining a vertical component of particle velocity from seismic data acquired using at least one receiver disposed within a water column comprises determining the vertical component of particle velocity from the pressure at a first location and a second location. The first location is the location of a first receiver, and is vertically beneath the second location. The method uses an operator accurate for seismic data acquired at a vertical separation between the first and second locations of up to at least 0.4 times the minimum wavelength of seismic energy used to acquire the seismic data. The second location may be at or above the surface of the water column. Alternatively, the method be applied to a twin streamer seismic surveying arrangement in which the second location is below the surface of the water column and is the location of a second receiver.

17 Claims, 10 Drawing Sheets

U.S. PATENT DOCUMENTS

| | | | | |
|---|---|---|---|---|
| 4,752,916 | A | * | 6/1988 | Loewenthal ................. 367/24 |
| 5,051,961 | A | * | 9/1991 | Corrigan et al. ............. 367/24 |
| 5,365,492 | A | * | 11/1994 | Dragoset, Jr. ................ 367/21 |
| 5,524,100 | A | * | 6/1996 | Paffenholz ................... 367/24 |
| 5,621,699 | A | * | 4/1997 | Rigsby et al. ................ 367/22 |
| 5,696,734 | A | * | 12/1997 | Corrigan ..................... 367/24 |
| 5,774,416 | A | * | 6/1998 | Sadek et al. ................. 367/24 |
| 5,774,417 | A | * | 6/1998 | Corrigan et al. ............. 367/24 |
| 5,825,716 | A | * | 10/1998 | Starr ............................ 367/24 |
| 5,963,507 | A | * | 10/1999 | Barr et al. ................... 367/15 |
| 5,991,238 | A | * | 11/1999 | Barr ............................ 367/62 |
| 6,026,057 | A | | 2/2000 | Byun et al. |
| 6,681,887 | B1 | * | 1/2004 | Kragh et al. ................ 181/110 |
| 6,775,618 | B1 | | 8/2004 | Robertsson et al. |
| 6,836,448 | B2 | * | 12/2004 | Robertsson et al. ......... 367/59 |
| 2003/0147306 | A1 | | 8/2003 | Robertsson |

FOREIGN PATENT DOCUMENTS

| | | |
|---|---|---|
| GB | 2 363 459 B | 4/2003 |
| GB | 2 389 183 A | 12/2003 |
| WO | WO 00/57207 A1 | 9/2000 |
| WO | WO 02/01254 A1 | 1/2002 |
| WO | WO 03/058281 A1 | 7/2003 |

OTHER PUBLICATIONS

Amundsen et al Frequency-wavenumber inversion of acoustic data Geophysics, vol. 56, 1991, pp. 1027-1039.

Amundsen Wavenumber-based filtering of marine point-source data. Geophysics, vol. 58, 1993, pp. 1335-1348.

Amundsen et al Extraction of the normal component of the particle velocity from marine pressure data Geophysics, vol. 60, 1995, pp. 212-222.

Amundsen Elimination of free-surface related multiples without need of the source wavelet Geophysics, vol. 66, 2001, pp. 327-341.

Kragh et al Rough seas and statistical deconvolution $63^{rd}$ Annual European Association of Geoscientists & Engineers (EAGE) Meeting, Amsterdam, The Netherlands, Jun. 2001, A-22.

Laws et al Time-lapse seismic and the rough-sea wavelet $70^{th}$ Annual International Meeting Society of Exploration Geophysicists Expanded Abstracts, 2000, pp. 1603-1606.

Mallick et al Practical aspects of reflectivity modeling Geophysics, vol. 52, 1987, pp. 1355-1364.

Martin et al Acquisition of marine point receiver seismic data with a towed streamer $70^{th}$ Annual International Meeting Society of Exploration Geophysicists Expanded Abstracts, 2000, pp. 37-40.

Osen et al Removal of water-layer multiples from multicomponent sea-bottom data Geophysics, vol. 64, 1999, pp. 838-851.

Osen et al Toward optimal spatial filters for demultiple and wavefield splitting of ocean-bottom seismic data Geophysics vol. 67, 2002, pp. 1983-1990.

Robertsson et al Rough-sea deghosting using a single streamer and a pressure gradient approximation Geophysics vol. 67, 2002, pp. 2005-2011.

Røsten et al Rough-sea deghosting using vertical particle velocity field approximations 64th Annual European Association of Geoscientists & Engineers (EAGE) Meeting, Florence, Italy, 2002, PO86.

Zhang et al Initial tests on deghosting Notes distributed at Mission-Orientated Seismic Research Program (M-OSRP) Dec. 2001 meeting consortium, University of Houston, Houston, Texas, USA.

* cited by examiner

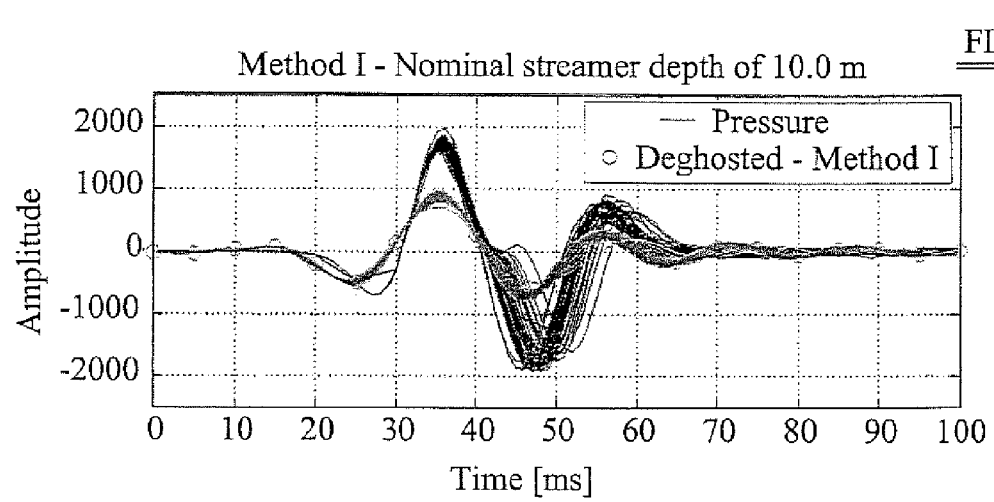
FIG 6(a) Method I - Nominal streamer depth of 10.0 m
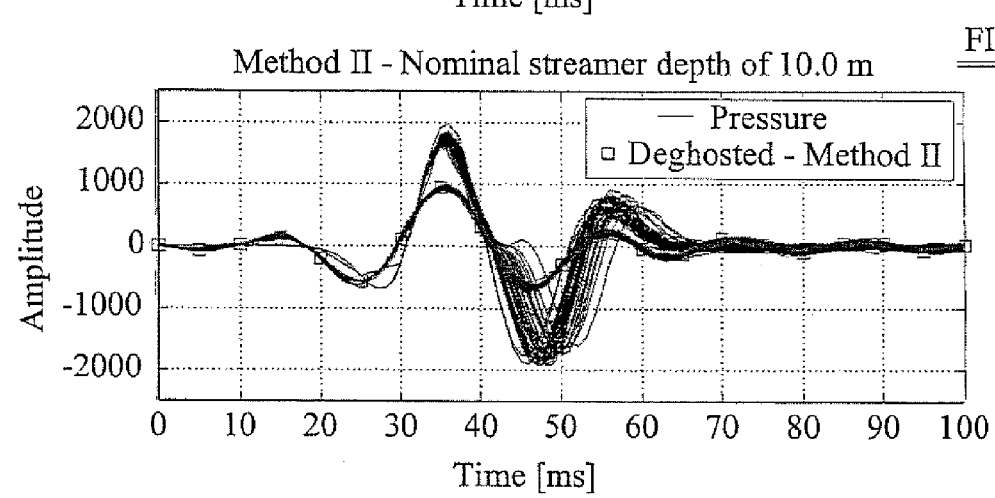
FIG 6(b) Method II - Nominal streamer depth of 10.0 m
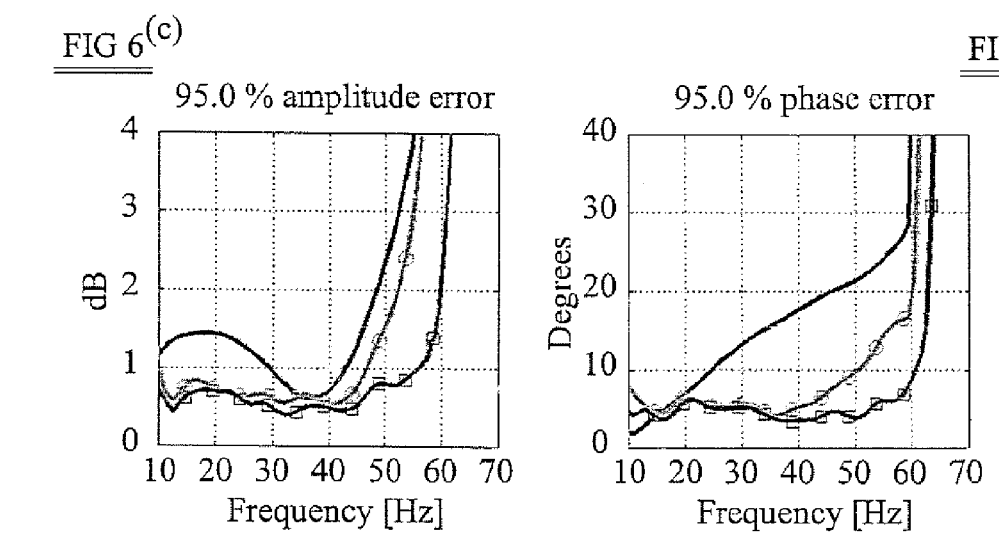
FIG 6(c) 95.0 % amplitude error
FIG 6(d) 95.0 % phase error

PROCESSING SEISMIC DATA

The present invention relates to processing seismic data and, in particular, to processing marine seismic data to reduce the effects of "ghost reflections". The present invention can be applied to processing both marine seismic data acquired in a flat sea and marine seismic data acquired in a rough sea.

FIG. 1 is a schematic diagram of a marine seismic survey in which seismic energy is emitted from a source 1 and detected by a seismic receiver 2 at a depth h below the surface 6 of the sea. Energy emitted from the source is reflected by the seabed 3 or by a reflector 4 below the seabed 3 and is then detected by the receiver. This path of seismic energy is labelled 5 in FIG. 1. Information about the geological structure of the earth's interior can be derived from the reflected seismic energy incident on the receiver The seismic receiver 2 shown in FIG. 1 is a streamer, which is a type of seismic receiver that is frequently used in marine seismic surveying. A streamer contains a plurality of sensors $S_1, S_2, \ldots S_N$ such as pressure sensors and/or particle velocity sensors distributed along its length, which may be some hundreds of metres, and is thus able to measure the reflected seismic energy at a number of points simultaneously. A streamer may be suspended from one or more floats 8, so that all the receivers of the streamer are at the same depth in a flat sea.

In addition to the desired path 5 of seismic energy shown in FIG. 1, other seismic energy paths will occur as a result of seismic energy being reflected or scattered from the sea surface 6. These paths are known as "ghost reflections". For example, reference 7 in FIG. 1 shows a ghost reflection in which the seismic energy reflected by the reflector 4 is not directly incident on the receiver 2, but undergoes a further reflection at the sea surface 6 before reaching the receiver. Down-going sea-surface ghost reflections are an undesirable source of contamination of seismic data, since they obscure the interpretation of the desired up-going reflections from the earth's interior.

As is well-known, the ghost signal will produce one or more "notches" in the frequency spectrum of seismic energy, with the frequency at which the notches occur depending on the depth of the receiver below the sea-surface.

The ghost signal reflected from the sea surface is delayed relative to the direct signal. There are two components to this delay: firstly, there is a 180° phase change upon reflection at the sea surface and, secondly, there is a time delay corresponding to the additional path length (which for a signal emitted in the vertical direction is 2z, or twice the depth of the receiver). The actual vertical far field signal is the sum of the direct signal and the ghost signal. The direct signal and the ghost signal will interfere, and this causes variations in the amplitude of the far field signal. For some frequencies, the interference is destructive and causes a zero amplitude or "notch" in the spectrum. This occurs at frequencies where the depth of the receiver is an even number of quarter wavelengths:

$$f_{notch} = (nc/2z), n = 0, 1, 2, 3 \ldots$$

(where c is the speed of sound in water, n is an integer giving the harmonic order, and z is the depth of the receiver below the sea surface).

Constructive interference occurs at frequencies exactly intermediate adjacent notch frequencies, and this leads to maxima in the amplitude at these frequencies, given by:

$$f_{peak} = (2n+1)c/4z, n = 0, 1, 2, 3 \ldots$$

The effect of the interference between the direct signal and the ghost signal can be thought of as applying a frequency domain "ghost filter" to the direct signal. The ghost filter has the following form:

$$g(f) = 1 + r^2 - 2|r|\cos(2zf/c)$$

(where r is the reflection coefficient at the sea surface). The amplitude spectrum of the ghost filter resembles a full-wave rectified sine wave, with zeros at the ghost notch frequencies and peaks of amplitude 2.0 (6 dB) at the peak frequencies.

FIG. 2 shows the amplitude of a typical ghost filter as a function of frequency. This figure shows the ghost filter for the case z=12 m, c=1500 m/s, and with a reflection coefficient of −1.0 at the sea surface. It will be seen that the amplitude decreases to 0 at the notch frequencies of 0 Hz, 62.5 Hz, 125 Hz . . . , and that there are maxima in the amplitude at the peak frequencies of 31.25 Hz, 93.75 Hz . . .

Seismic deghosting is an old and long-standing problem. Traditionally, the primary goal of deghosting has been to broaden the bandwidth of the data through the notch frequencies. Many prior approaches to de-ghosting seismic data have used the assumptions of a perfectly flat sea surface, a streamer at a known depth below the sea surface, and vanishing pressure at the sea surface. In real seismic data acquisition, however, the sea surface is very often rough. Deterministic algorithms that use an explicit mean streamer depth in the deghosting calculations will not work reliably in rough sea conditions. Even statistical methods cannot fully correct for the ghost reflections in rough sea conditions, owing to the time variant nature of the problem, as shown by E. Kragh and R. Laws in "Rough seas and statistical deconvolution", $62^{nd}$ Annual EAGE Meeting (2001).

The effects of rough seas on the seismic data have recently been the subject of considerable research. In particular, R. Laws and E. Kragh have shown, in "Time-lapse seismic and the rough sea wavelet", $70^{th}$ Ann. Int. Mtg of Soc. Exploration Geophysicists, Extended Abstracts pp 1603-1606 (2000), that errors arising in processing data acquired in rough sea conditions are significant for time-lapse seismic surveying and for the reliable acquisition of repeatable data for stratigraphic inversion.

As pointed out in UK patent application No 0015810.5, correction of the rough-sea surface ghost requires that the wavefield is completely separated into its up- and down-going components. The separation requires in general that the pressure and the vertical component of the particle velocity (or equivalently the vertical pressure gradient) are both recorded (see, for example, the equations given by L. Amundsen in Geophysics, Vol 58, pp 1335-1348 (1993)).

Another possibility, as suggested by J. O. A. Robertsson and E. Kragh in "Rough sea deghosting using a single streamer and a pressure gradient approximation", submitted to Geophysics (2001) and further investigated by Rosten et al. in "Rough sea deghosting using a vertical particle velocity field approximation", submitted to $63^{rd}$ Annual EAGE meeting, is to derive an estimate of the vertical component of the particle velocity from the pressure acquired at a receiver by using the fact that the pressure vanishes at the sea surface. The zero pressure along a contour vertically above the streamer may be regarded as a second streamer in a dual streamer configuration.

Robertsson and Kragh (above) and PCT application PCT/IB01/01150 suggest using a technique from synthetic finite-difference modelling of seismic wave propagation, known as the Lax-Wendroff correction, to derive equations for the vertical pressure gradient at a streamer in the vicinity of a rough sea surface. The equations express the vertical pressure gradient in terms of the pressure gradient along the streamer and the time-derivative of the pressure, both of which may readily be obtained from data acquired by the streamer. The seismic data may then be de-ghosted using the pressure and the approximation for the vertical pressure gradient. In contrast to other proposals for seismic deghosting, the method of Robertsson and Kragh is local: a short spatial filter (typically of length three) is used to deghost the pressure data acquired at a single receiver.

A first aspect of the present invention provides a method of determining a vertical component of particle velocity from seismic data acquired using at least one receiver disposed within a water column, the method comprising: determining the vertical component of particle velocity from the pressure at a first location and a second location, the first location being the location of a first receiver and being vertically beneath the second location, using an operator accurate for seismic data acquired at a vertical separation between the first and second locations of up to at least 0.4 times the minimum wavelength of seismic energy used to acquire the seismic data.

The locations may be defined in the co-ordinate system of the first receiver, and in this case the locations will be constant with time. The locations may alternatively be defined in the earth's co-ordinate system, in which case the locations will vary as the first receiver moves through the water.

The present invention provides an improved method of estimating of the vertical particle velocity. Earlier methods of estimating the vertical component of the particle velocity have been applicable only for a restricted range for the depth of the receiver below the surface of the water column. As discussed below, the prior art method is accurate only if the depth of the receiver, below the surface of the water column, is no greater than $\lambda/3.5$, where $\lambda$ is the minimum wavelength of seismic energy used in the acquisition process. This severely restricts the choice of receiver arrays with which the method can be used. The present invention provides a method of estimating the vertical component of the particle velocity that can be used with data acquired at greater depths than hitherto.

The second location may be at or above the surface of the water column. In this embodiment the invention may be used to process data acquired at a single streamer. In this embodiment, the streamer may be located at a greater depth within the water column than in the prior art methods.

Alternatively, the second location may be below the surface of the water column and may be the location of a second receiver. In this embodiment the invention may be used to process data acquired at two vertically-separated streamers. In this embodiment, the vertical separation between streamers may be greater than in prior art methods.

The method may comprise determining the vertical component of particle velocity at the second location from pressure acquired at the second receiver and from pressure acquired at the first receiver.

The method may comprise determining the vertical component of particle velocity at the second location according to the following equation or from an equation derived therefrom:

$$v_z(\omega, k_x, k_y, z_1) = \frac{ik_z}{\rho\omega}\cot(k_z\Delta z)p(\omega, k_x, k_y, z_1) - \frac{ik_z}{\rho\omega\sin(k_z\Delta z)}p(\omega, k_x, k_y, z_2).$$

The method may comprise determining the vertical component of particle velocity at the second location from the following equation:

$$v_z(\omega, k_x, k_y, z_1) = \frac{i}{\rho\omega\Delta z}\sum_{m=0}^{\infty}(-1)^m F_m^{(1)}\kappa^{2m}p(\omega, k_x, k_y, z_1) -$$

$$\frac{i}{\rho\omega\Delta z}\sum_{m=0}^{\infty}(-1)^m F_m^{(2)}\kappa^{2m}p(\omega, k_x, k_y, z_2)$$

where $F_m = k^{-2m}\sum_{n=m}^{\infty}A_{nm}(k\Delta z)^{2n}$, $A_{nm} = (-1)^{n-1}\frac{2^{2n}-2}{(2n)!}B_{2n}\binom{n}{m}$, $B_n$ is the $n^{th}$ Bernoulli number, and $\kappa^2 = k_x^2 + k_y^2$.

This provides an approximation to the previous equation.

In a particularly preferred embodiment, each summation over m is carried out over m=0 to m=1. This provides an approximation that is more accurate than known approximations but that may be calculated relatively easily.

The operator may be a spatially compact operator. The term "spatially compact operator", as used herein, means a spatial filter having a length (in the spatial domain) that is greater than one but that is less than the number of pressure sensors on the streamer.

The method may comprise the further step of processing the seismic data using the vertical component of the particle velocity. For example, the method may comprise processing the seismic data so as to determine at least one of an up-going component and a down-going component of the seismic data.

The method may comprise processing the seismic data using the vertical component of the particle velocity thereby to attenuate effects in the processed data of seismic energy reflected and/or scattered at the free-surface of the water column.

The method may comprise processing the seismic data using the vertical component of the particle velocity thereby to obtain information about the signature of the source of seismic energy.

The seismic data may comprise pressure and particle velocity data, and the method may comprise comparing the vertical component of the particle velocity determined from the acquired pressure with the measured values of the particle velocity.

Alternatively, the seismic data may comprise pressure and particle velocity data, and wherein the method may comprise the step of determining the depth of the seismic receiver within the water column from the measured vertical component of the particle velocity and the vertical component of the particle velocity determined from the pressure.

A second aspect of the invention provides a method of determining a vertical component of particle velocity from seismic data acquired at first and second vertically-separated streamers disposed within a water column, the first streamer comprising M (M>1) pressure sensors disposed along the length of the first streamer and the second streamer comprising N (N>1) pressure sensors disposed along the length of the second streamer, the method comprising applying to the pressure acquired at sensors on at least one streamer an operator having a length (in the spatial domain) that is greater than one but that is less than the number of pressure sensors on the respective streamer.

This embodiment may comprise applying an operator of length m where 1<m<M to the pressure acquired at each sensor on the first streamer and applying an operator of length n where 1<n<N to the pressure acquired at each sensor on the second streamer.

A third aspect of the invention provides a method of acquiring marine seismic data comprising the steps of: actuating an array of one or more seismic sources to emit seismic energy; acquiring seismic data at one or more receivers disposed within a water column, the seismic data including at least pressure data; and processing the acquired pressure data according to a method as defined above.

A fourth aspect of the invention provides an apparatus for determining a vertical component of particle velocity from seismic data acquired using at least one receiver disposed within a water column, the apparatus having means for determining the vertical component of particle velocity from the pressure at a first location and a second location, the first location being the location of a first receiver and being vertically beneath the second location, using an operator accurate for seismic data acquired at a vertical separation between the first and second locations of up to at least 0.4 times the minimum wavelength of seismic energy used to acquire the seismic data.

A fifth aspect of the invention provides an apparatus for determining a vertical component of particle velocity from seismic data acquired at first and second vertically-separated streamers disposed within a water column, the first streamer comprising M (M>1) pressure sensors disposed along the length of the first streamer and the second streamer comprising N (N>1) pressure sensors disposed along the length of the second streamer, the apparatus comprising means for determining the vertical component of particle velocity by applying to the pressure acquired at sensors on at least one streamer an operator having a length (in the spatial domain) that is greater than one but that is less than the number of pressure sensors on the respective streamer.

The apparatus may comprise a programmable data processor.

A sixth aspect of the invention provides a storage medium containing a program for the data processor of an apparatus as defined above.

A seventh aspect of the invention provides a storage medium containing a program for controlling a data processor to perform a method as defined above.

The present invention also provides a method of determining a vertical component of particle velocity from seismic data acquired at a receiver disposed within a water column, the method comprising determining the vertical component of particle velocity from the pressure acquired at the receiver using a operator accurate for seismic data acquired at a depth beneath the surface of the water column of up to at least 0.4 times the minimum wavelength of seismic energy used to acquire the seismic data. In a preferred embodiment, the operator is accurate for seismic data acquired at substantially any depth beneath the surface of the water column.

The operator may be a spatial and/or wavenumber dependent operator.

This method may comprise determining the vertical component of particle velocity from the pressure acquired at the receiver using the following equation or an equation derived therefrom:

$$v_z(\omega, x, y, z) = -\frac{i}{\rho \omega z} \sum_m F_m(k, z) D_2^m(x, y) * p(\omega, x, y, z) \quad (2)$$

where p is the acquired pressure wavefield, $v_z$ is the vertical component of particle velocity, $\omega$ is the angular frequency, $k(=\omega/\alpha)$ is the wavenumber, $\alpha$ is the P-wave velocity, $\rho$ is the density, $D_2$ is a differential operator, $$F_m = F_m(k, z) = k^{-2m} \sum_{n=m}^{\infty} A_{nm}(kz)^{2n}$$

and * is the 2D spatial convolution operator.

Equation (2) is an exact expression, and is accurate for any receiver depth. Use of equation (2) enables the vertical particle velocity to be obtained from seismic data acquired at any receiver depth.

In order to reduce the computation required to apply equation (2), it is possible to solve an equation derived from equation (2) in which the summation is truncated, rather than solving equation (2) exactly. Solving a truncated form of equation (2) reduces the computation required, but at the expense of accuracy. A truncated version of equation (2) will generally not be accurate for any receiver depth, but will be accurate only for a receiver depth less than some maximum value.

This method may alternatively comprise determining the vertical component of particle velocity from the pressure acquired at the receiver using the following equation or an equation derived therefrom:

$$v_z(\omega, x, z) \approx F_k * p(\omega, x, z), \text{ where}$$

$$\tilde{F}_k = \min_{b_m, a_n} \sum_{k=-(K-1)}^{K-1} W_k \left| \frac{\Theta_{km} b_m}{\Phi_{kn} a_n} - F_k \right|^2$$

where $a_n$ and $b_m$ are the backward and forward filter coefficients, $W_k$ are a set of positive weights, * is the 1-D spatial convolution operator and $F_k = F(k\Delta k_x)$ denote the desired discrete horizontal wavenumber response.

This filter is an approximation of equations (A34) and (A36) given in the appendix below. Equations (A34) and (A36) are exact, but are not valid for the case of a rough sea surface; this approximation allows them to be applied to the case of a rough sea surface.

This method may use the following filter:

$$\tilde{F}_k = \min_{g_m} \sum_{k=0}^{K-1} W_k |\Gamma_{km} g_m - F_k|^2$$

where $\Gamma_{km} = \cos(k\Delta k_x m\Delta x)$, $b_m = 0.5 g_m$ for $g_m = 1, 2, \ldots, M/2$ and $b_0 = g_0$.

The estimate of the vertical particle velocity provided by the present invention may be used to de-ghost the data. Alternatively, the estimate of the particle vertical velocity provided by the present invention may be used in other seismic data processing applications such as estimation of the source signature.

The present invention also provides a method of processing seismic data acquired at a receiver located on a streamer disposed within a water column, the method comprising the step of determining a derivative of the pressure in a horizontal direction perpendicular to the streamer from a derivative of the pressure in a direction along the streamer. This may be done using:

$$\frac{\partial^2}{\partial y^2} p(x_0, y_0) = \frac{1}{x_0} \frac{\partial}{\partial x} p(x_0, y_0)$$

where the streamer extends along the x-axis and the source is located at $(0, y_0)$.

In this equation, the receiver co-ordinates in the x-y plane are $(x_0, y_0)$. This enables the derivatives of pressure in the cross-line direction to be estimated even for a single streamer. In contrast, the prior art methods require at least two laterally separated streamers to determine derivatives in the cross-line direction.

The present invention also provides a method of determining a vertical component of particle velocity comprising determining the vertical component of particle velocity from the pressure acquired at the receiver using the following equation or an equation derived therefrom:

$$v_z(\omega, x, y, z) = -\frac{i}{\rho\omega z} \sum_m F_m(k, z) D_2^m(x, y) * p(\omega, x, y, z).$$

Other preferred features of the invention are defined in the dependent claims.

Preferred embodiments of the present invention will now be described by way of illustrative example with reference to the accompanying drawings in which.

Figure 7:
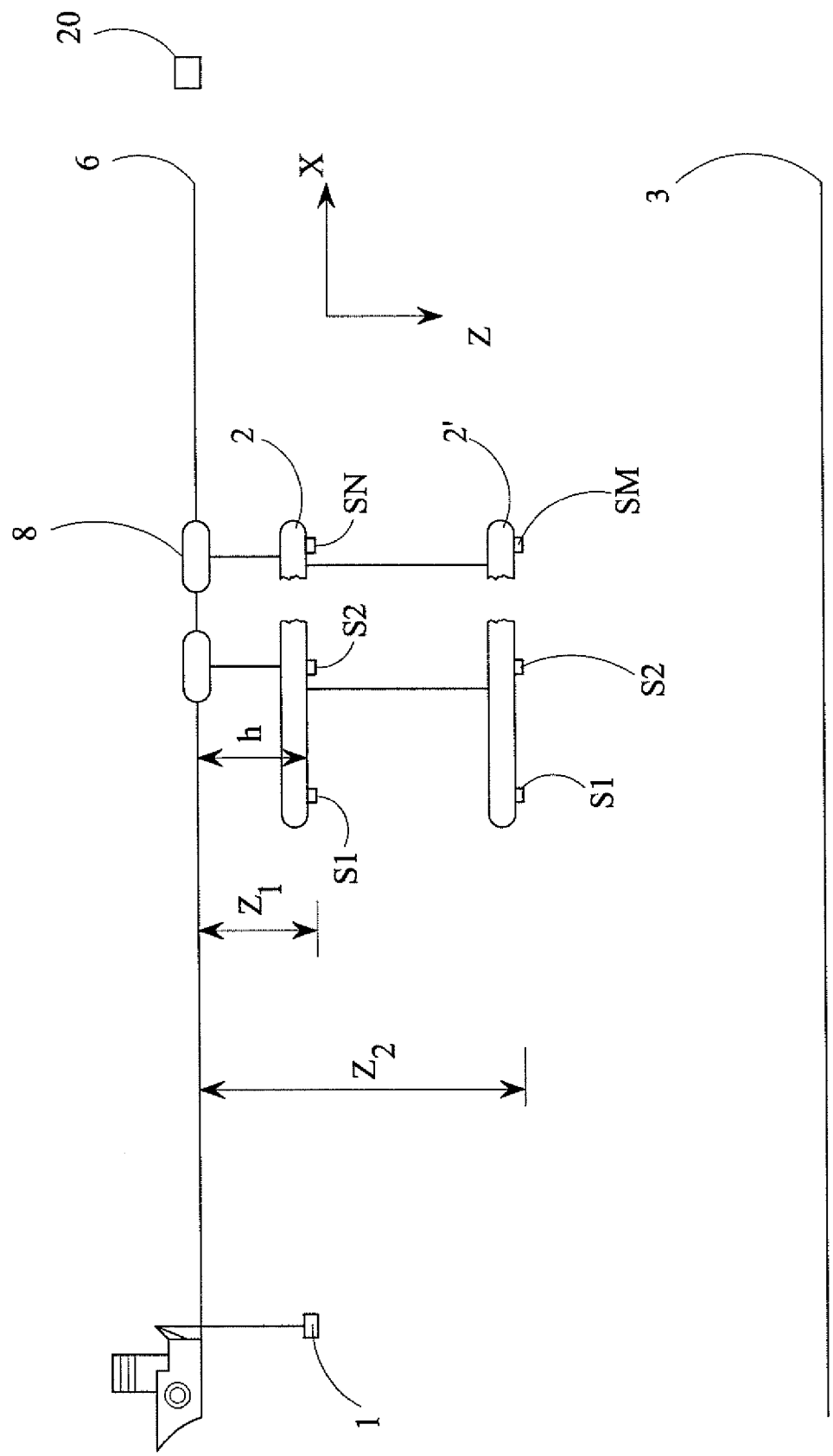
Figure 8A:
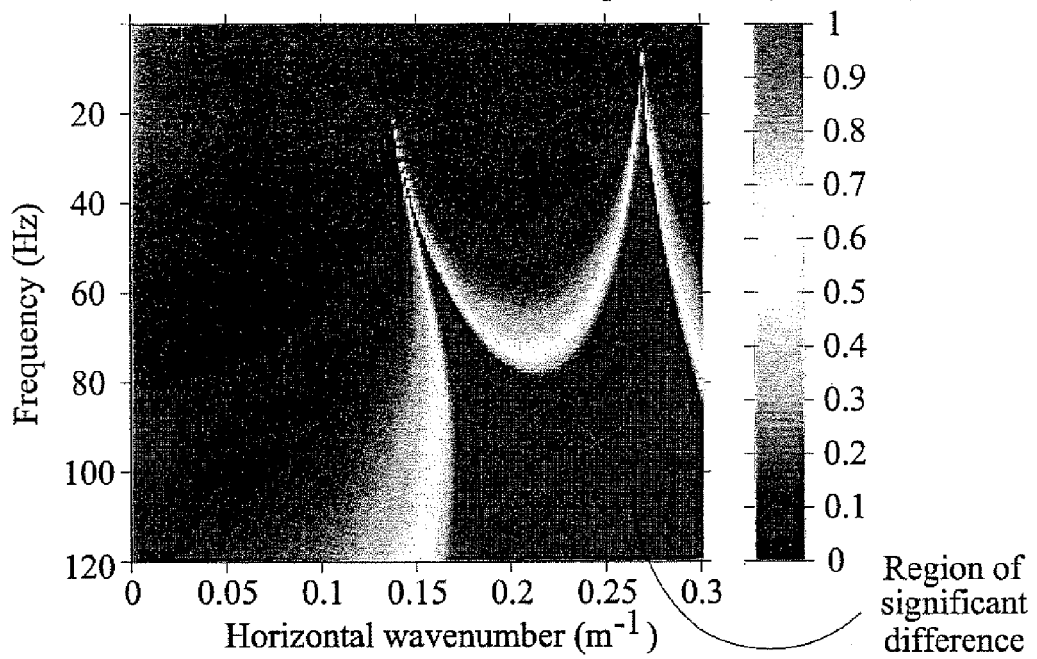
Figure 8B:
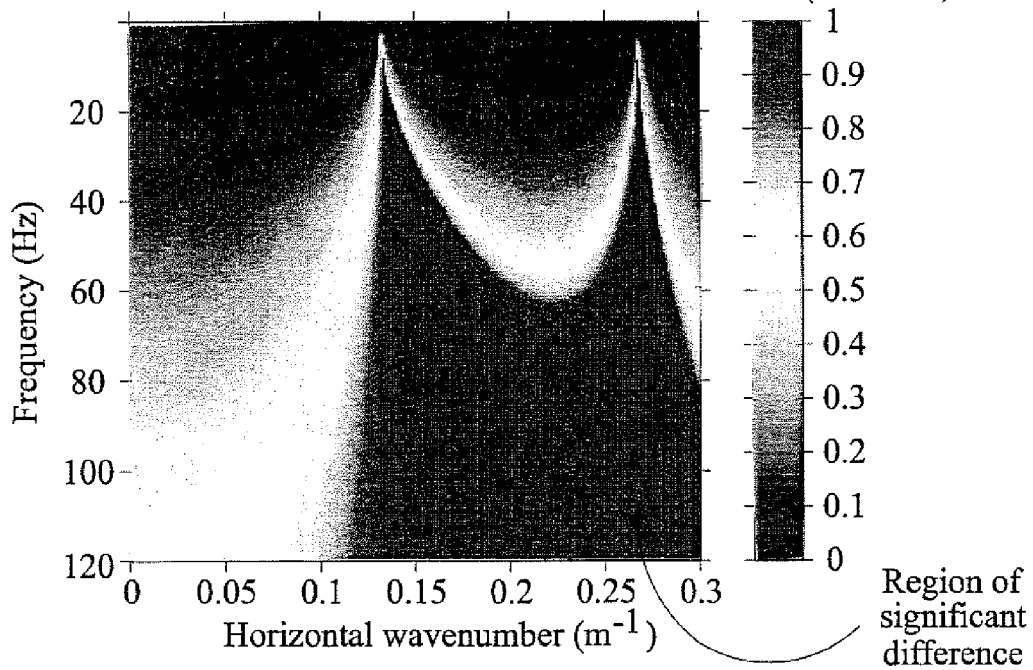
Figure 8C:
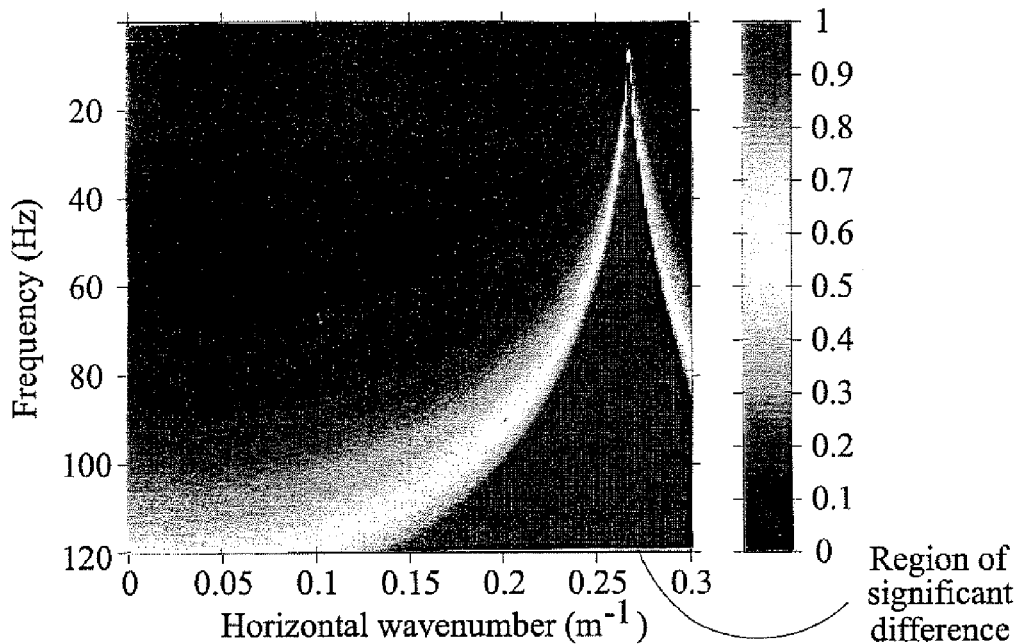
Figure 8D:
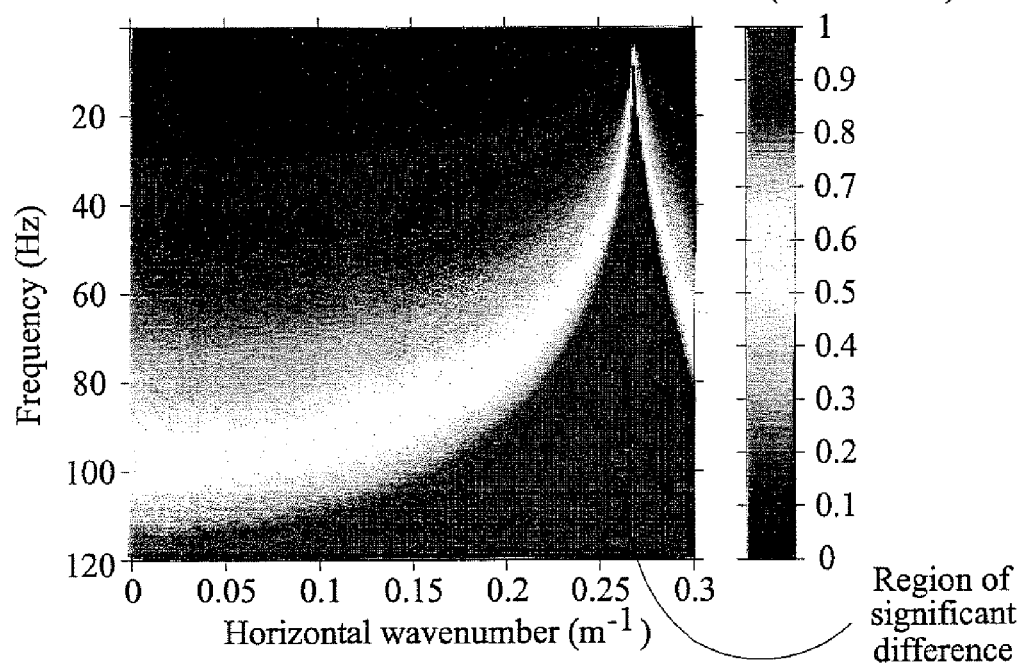
Figure 9:
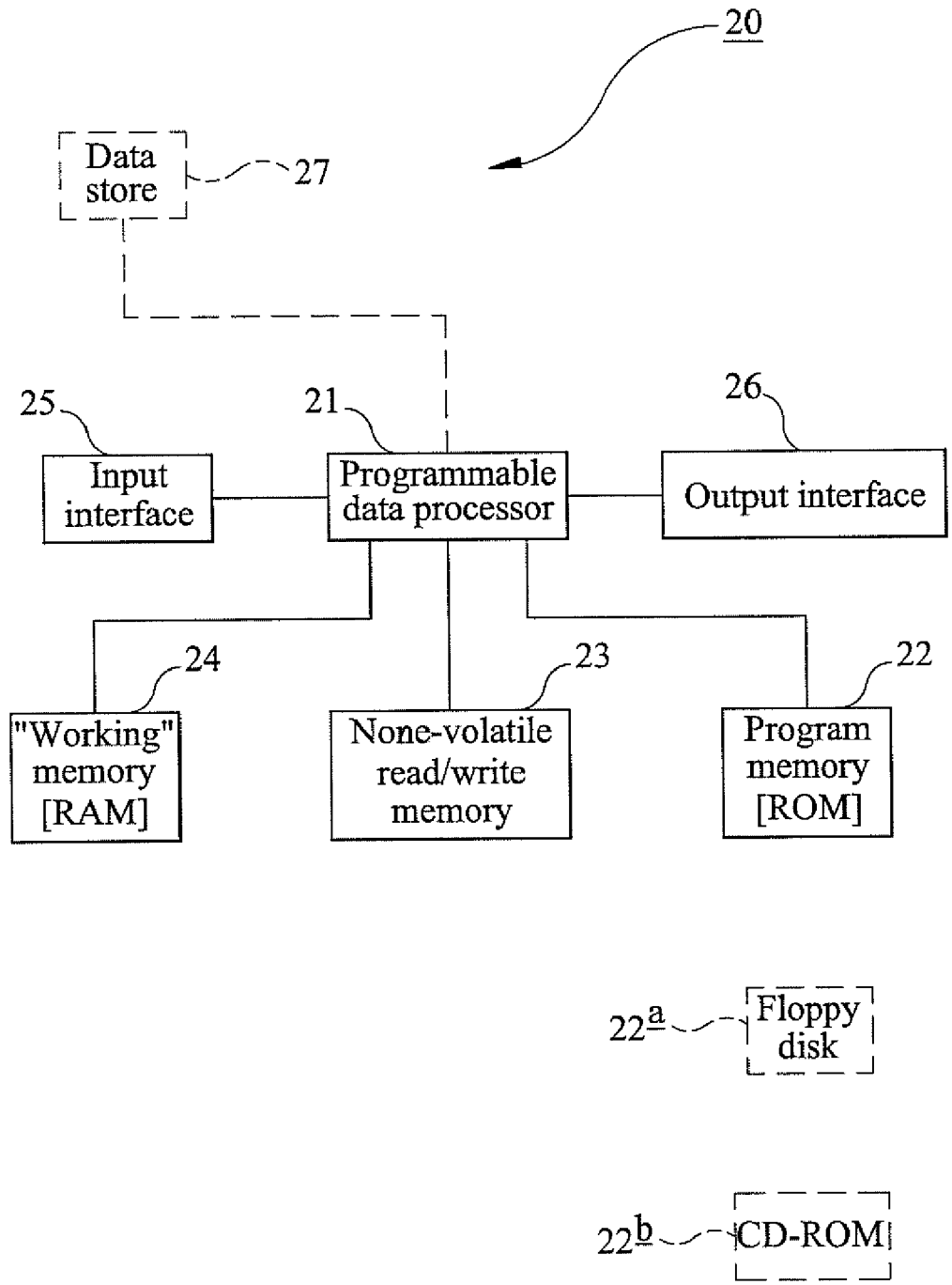

FIGS. 5(a) to 5(d) illustrate the results of a de-ghosting method for a streamer at a depth of 6 m;

FIGS. 6(a) to 6(d) illustrate the results of a de-ghosting method for a streamer at a depth of 10 m;

FIG. 7 is a schematic illustration of a twin streamer seismic surveying arrangement;

FIGS. 8(a) to 8(d) show results obtained by a twin streamer de-ghosting method of the present invention; and FIG. 9 is a schematic block sectional diagram of an apparatus according to the present invention.

Removing the effects of ghost reflections from pressure data acquired at a seismic receiver disposed within a water column is equivalent to separating the acquired pressure into its up-going and down-going components. The de-ghosted component of the acquired pressure is the up-going component. Various methods for separating acquired pressure data into up-going and down-going components have been proposed, including the following:

$$\tilde{P} = \frac{1}{2}\left[P - \frac{\rho\omega}{k_z} V_z\right] \quad (1)$$

In this equation, $\tilde{P}$ denotes the spatial Fourier transform of the de-ghosted (up-going) component of the acquired pressure, P denotes the spatial Fourier transform of the acquired pressure p, $\rho$ denotes the density of the water column, $\omega$ denotes the angular frequency, $k_z$ is the vertical wave number, and $V_z$ is the spatial Fourier transform of the vertical component of the particle velocity $v_z$.

$V_z$, P and $\tilde{P}$ will in general be functions of the horizontal wave numbers $k_x$ and $k_y$, the angular frequency, and the depth z of the receiver. The equation (1) above is valid for all wave numbers.

One prior art method of de-ghosting pressure data acquired at a seismic receiver disposed within a water column is to use equation (1) to determine the de-ghosted (up-going) pressure component. This method has had the disadvantage that, until now, a sufficiently accurate expression for $v_z$ has not been available. Although various approximate formulations for computing $v_z$ have been proposed, these have generally only been applicable for a limited range of receiver depth or frequency of seismic energy. For example, one prior art approximation for $v_z$ is that given in equations (A1) and (A2) in the appendix, and this prior art approximation is only accurate if the receiver depth is less than approximately $\lambda/3.5$, where $\lambda$ is the minimum wavelength of seismic energy. This approximation also requires that the separation between adjacent receivers on a streamer is around 3 m or less. Furthermore, this prior method is fundamentally limited to frequencies of seismic energy below the first ghost notch frequency so that, for example, for a streamer depth of 6 m equation (A1) is accurate up to only approximately 70 Hz.

The present invention provides more accurate expressions for the vertical particle velocity $v_z$, and thus enables more accurate de-ghosting of pressure data using equation (1).

According to the present invention, the vertical component of the required particle velocity is determined using the following equation, or using an equation derived therefrom:

$$v_z = -\frac{i}{\rho\omega z} \sum_m F_m(k, z) D_2^m(x, y) * p, \quad (2)$$

In equation (2), the functions $F_m(k_z)$ are functions that are independent of the horizontal spatial co-ordinates and are given by:

$$F_m = F_m(k, z) = k^{-2m} \sum_{n=m}^{\infty} A_{nm}(kz)^{2n} \quad (3)$$

where $$A_{nm} = \frac{(-1)^n 2^{2n} B_{2n}}{(2n)!} \binom{n}{m} \quad (4)$$

In equation (4), $A_{nm}$ are scalar quantities, $B_n$ is the $n^{th}$ Bernoulli number, and n! is the factorial of n.

In equation (2) above $D_2$ is a differential operator, and * denotes the two-dimension spatial convolution operator. The components p, $v_z$ are in general functions of ω, x, y and z.

Differentiation generally leads to large amplification of high wavenumbers. Hence, in practical situations a band-limited version of a differential operator is preferably used for $D_2$.

The expression for $v_z$ given in equation (2) is valid for all receiver depths in the water column. Use of equation (2) to determine the vertical component of the particle velocity enables accurate determination of the vertical component of the particle velocity for pressure data acquired at any depth in a water column. This in turn enables further processing steps that require knowledge of the vertical component of the particle velocity—such as de-ghosting, for example—to be carried out accurately for pressure data acquired at any depth in a water column.

The present invention is not limited to use of the exact equation (2) to obtain the vertical component of the vertical particle velocity. The invention also envisages that the vertical component of the vertical particle velocity may be obtained using an equation derived from equation (2) such as, for example, an approximate solution to equation (2).

A special case of equation (2) arises when m is finite, and extends from zero to M. In this case, and assuming infinite bandwidth, equation (2) may be re-written as:

$$v_z \approx -\frac{i}{\rho \varpi z} \sum_{m=0}^{M} F_m(k, z) \left( \frac{\partial^2}{\partial x^2} + \frac{\partial^2}{\partial y^2} \right)^m p, \qquad (6)$$

The functions $F_m$ are given in equation (3) above as infinite series. The functions $F_m$ may also be written analytically in terms of trigonometric functions, and examples for $F_0$, $F_1$, $F_2$ are given in equations (A8), (A9) and (A10) below.

It will be seen that the x- and y-variables in equation (6) are de-coupled from z. This indicates that equation (6) is valid for a rough surface of the water column, as well as for a flat surface of the water column. This preferred embodiment of the present invention therefore provides a further advantage, since it enables accurate de-ghosting of pressure data acquired in rough sea conditions to be carried out, for any receiver depth in the water column.

In the case where M=2 equation (6) reduces to:

$$v_z \approx -\frac{i}{\rho \omega z}\left[F_0 + F_1\left(\frac{\partial^2}{\partial x^2} + \frac{\partial^2}{\partial y^2}\right) + F_2\left(\frac{\partial^2}{\partial x^2} + \frac{\partial^2}{\partial y^2}\right)^2\right]p \qquad (7)$$

The spatial derivatives in equations (6) and (7) may be estimated from the pressure acquired at two or more receivers. For example, the pressure derivative along the x-axis (which is assumed to coincide with the axis of the streamer) may be determined from the pressure recorded at the same time at different receivers along the streamer.

The preferred method of determining the spatial derivatives will depend on the spatial sampling interval—that is, the distance between adjacent sensors on a streamer. Where there is a low sampling interval—that is the sensors are closely spaced and so provide densely sampled pressure data, the spatial derivatives may be represented by classical central finite—difference approximations. In the case of equation (7), for example, the second-order spatial derivatives may be estimated using a three-point finite difference operator that estimates the spatial derivative in the x-direction of the pressure at one receiver from the pressure values acquired at that receiver and at the adjacent receiver on each side (this is sometimes known as an iterative filter of length 3).

For a coarse receiver spacing, the horizontal derivatives are most preferably implemented as numerically optimised difference operators, or using Fourier techniques. In a Fourier technique, the derivatives are obtained by Fourier transforming the pressure to the wavenumber domain, multiplying by the negative square of the wavenumber (for the second derivative), and inverse Fourier transforming the result.

Equations (6) and (7) are derived from, and are particular cases of, equation (2), in which the variable m is chosen to be finite. Further special cases occur when the variables m and n in equation (2) are both chosen to be finite, with m varying from 0 to M and with n varying from m to N (m). In this case, equation (2) reduces to the following:

$$v_z \approx \frac{i}{\rho \varpi z} \sum_{m=0}^{M} F_m(k, z) \left( \frac{\partial^2}{\partial x^2} + \frac{\partial^2}{\partial y^2} \right)^m p \qquad (8)$$

In equation (8), the functions $F_m$ have the same general form as given in equation (3), but the summation over n is now carried out from m to N(m), as shown in equation (A20) below.

If we choose M=1, N(0)=2, and N(1)=1, equation (8) reduces to the following:

$$v_z \approx -\frac{i}{\rho \varpi z}\left[A_{00} + A_{10}(kz)^2 + A_{11}z^2\left(\frac{\partial^2}{\partial x^2} + \frac{\partial^2}{\partial y^2}\right)\right]p \qquad (9)$$

where the scalar coefficients have the following values: $A_{00}=1$, $A_{10}=A_{11}=-\frac{1}{3}$.

It will be seen that equation (9) has the same general structure as the prior art equation (A1) given in the Appendix below. The scalar coefficients $A_{10}$ and $A_{11}$ in equation (9), however differ from the scalar coefficients in equation (A1). This has the significant effect that equation (9) is valid for greater streamer depths than equation (A1). (Equation (2) above is valid for all streamer depths, but the depth range over which an approximate solution to equation (2) will be valid varies from one approximate solution to another.) Equation (9) is valid at depths up to approximately λ/2.5, where λ is the minimum wavelength, whereas equation (A1) requires that the streamer depth is no greater than approximately λ/3.5.

Figure 3:
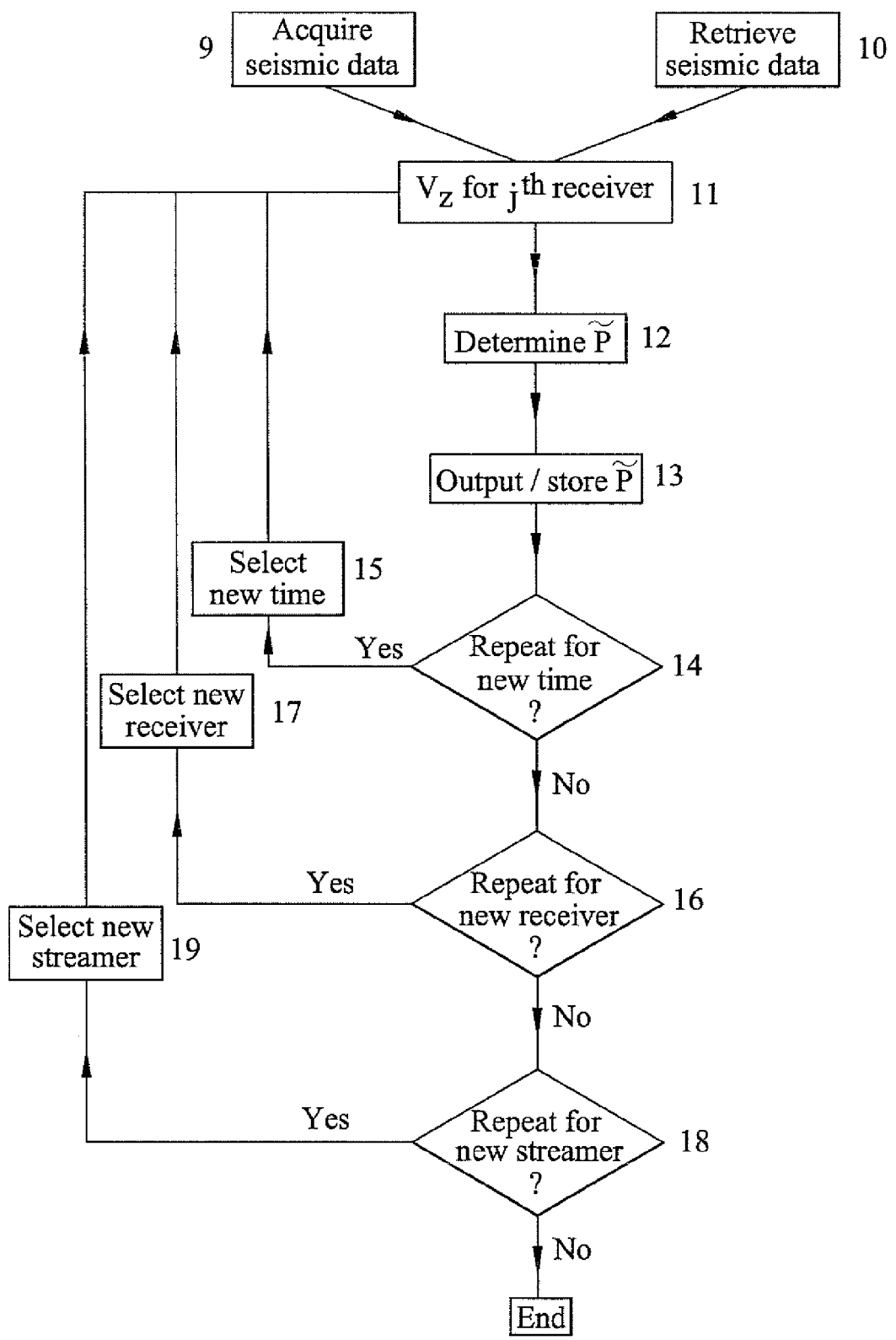
FIG. 3 is a block flow diagram of a method of the present invention.

FIG. 3 is a block flow diagram illustrating one method of the present invention.

Initially, at step 9, seismic data are acquired at a plurality of receivers disposed within a water column. In general, step 9 will consist of acquiring seismic data using a seismic surveying arrangement of the general type shown in FIG. 1 in which a plurality of seismic receivers S1 . . . SN are disposed on a streamer 2 that is set at a depth h below the surface of the water column. The data may be acquired with a single streamer, or they may be acquired with two or more streamers that are separated laterally (that is, separated along the y-axis) from one another.

The invention may alternatively be used to process preexisting seismic data Step 9 of acquiring seismic data may therefore be replaced by step 10 of retrieving pre-existing seismic data from storage.

At step 11, the vertical component of the particle velocity $v_z$ is calculated for one receiver (for example the $j^{th}$ receiver). Step 11 is carried out using equation (2), or using any equation derived from equation (2) such as equation (6), (7), (8) or (9). As outlined above, the values of the pressure derivatives occurring in these equations are estimated using pressure values acquired at two or more receivers.

Once the vertical component of the particle velocity has been determined for the $j^{th}$ receiver, the pressure data acquired at the $j^{th}$ receiver may then be de-ghosted at step 12. The de-ghosting step is carried out using equation (1), with the component $V_z$ being obtained by a spatial Fourier transform on the output of step 11.

At step 13 the results of step 12 are output, for example by display by an operator, or are alternatively stored for subsequent retrieval.

Figure 1:
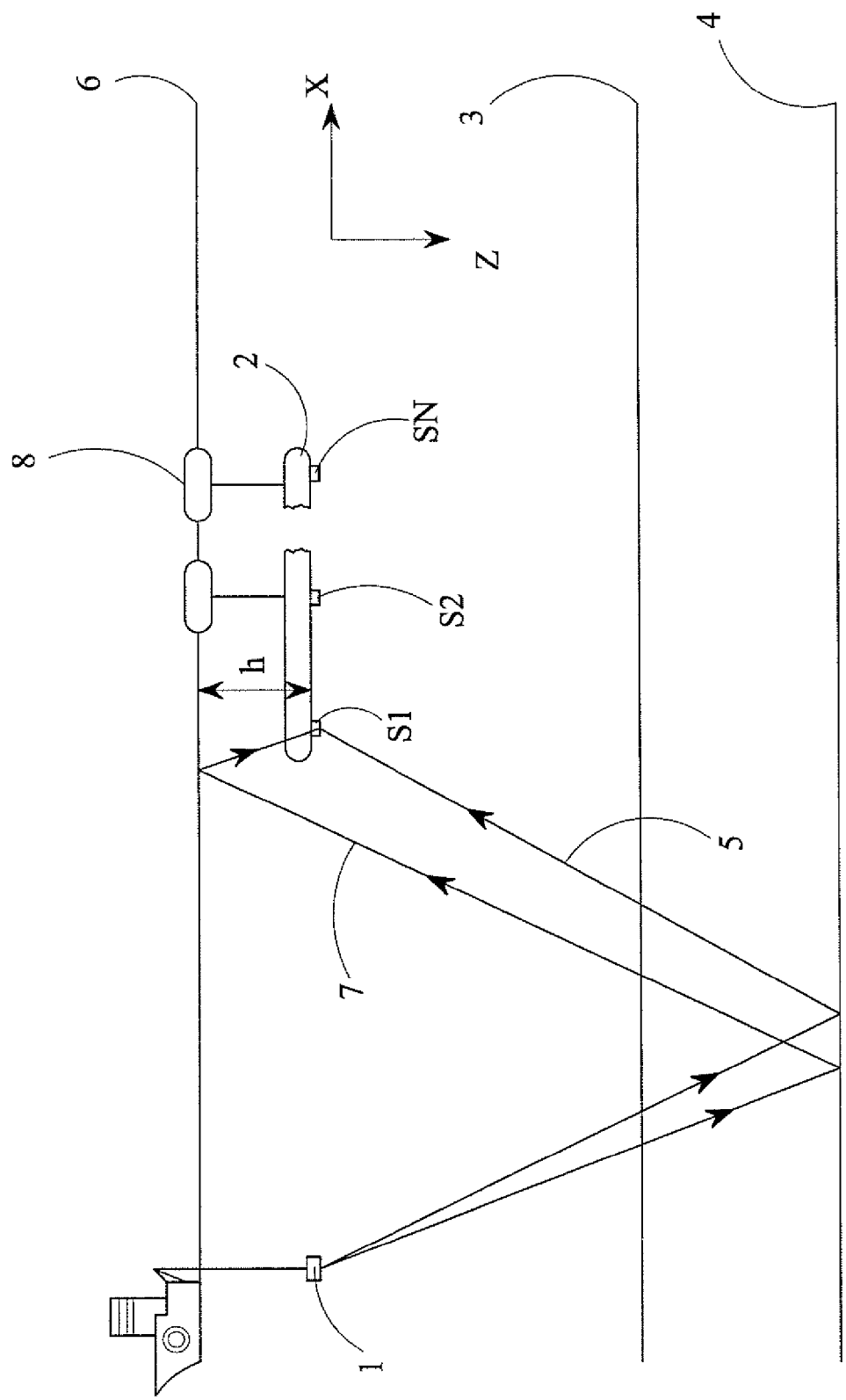
FIG. 1 is a schematic sectional view of a towed marine's seismic survey.

A receiver $S_i$ on the streamer 2 of FIG. 1 will acquire data by sampling the incident seismic wavefield at discrete time values and so will record the values of the wavefield at times $t_0$, $t_0+t_s$, $t_0+2 t_s$ ..., where $t_s$ is the sampling time. Steps 11 to 13 have been performed on data acquired at one particular sampling time. At step 14, therefore it is determined whether the de-ghosting should be repeated for data acquired by the receiver at a different sampling time. If this yields a "yes" determination, a new sampling time is selected at step 15, and steps 11-13 are repeated for data acquired at the new time. This process is repeated until a "no" determination is obtained at step 14.

At step 16 it is determined whether steps 11, 12 and 13 should be repeated for data acquired by another receiver on the streamer. If step 16 yields a "yes" determination, a new receiver is selected at step 17, and steps 11 to 14 and, if necessary step 15, are repeated for the new receiver. This loop is repeated until a "no" determination is obtained at step 16.

If it is desired systematically to de-ghost data acquired by every receiver on a streamer, the index j may initially be set to 1, step 16 may consist in determining whether the index j is equal to the total number of receivers J on the receiver, and step 17 may consist of incrementing j by 1.

When a "no" determination is obtained at step 16, step 18 then determines whether the process should be repeated for data acquired by another streamer. If this step yields a "yes" determination, a new streamer is selected at step 19, and steps 11-17 are then repeated for the receivers on the new selected streamer.

Where the method of the present invention is applied to data acquired using only a single streamer, step 18 may be omitted and step 19 is not applicable.

As noted above, the present invention may be applied to seismic data acquired using only a single streamer—that is, to seismic data acquired at receivers all located at the same y-co-ordinate value. In this case, it would initially appear difficult to obtain the spatial derivatives in the y-direction (perpendicular to the length of the streamer), that are required to allow solution of, for example, equations (6), (7), (8) or (9). A further aspect of the present invention, therefore, provides a method of estimating the necessary derivatives in the y-direction a derivative of the pressure along the streamer. A streamer generally contains a large number of pressure sensors disposed at regular intervals along the length of the streamer, and the spatial derivative of the pressure along the streamer can readily be estimated from the pressure acquired at the sensors. The present invention makes it possible to estimate a spatial derivative in a direction perpendicular to the streamer from data acquired for a single streamer, from a spatial derivative of the pressure along the streamer.

The method of estimating a spatial derivative in a direction perpendicular to the streamer from data acquired for a single streamer may be carried out in connection with a determination of the vertical component of the particle velocity according to the method described above, but it is not limited to use in connection with determination of the vertical component of the particle velocity.

In a preferred embodiment, a spatial derivative in a direction perpendicular to the streamer may be estimated using the following equation:

$$\frac{\partial^2}{\partial y^2} p(x_0, y_0) = \frac{1}{x_0} \frac{\partial}{\partial x} p(x_0, y_0). \qquad (10)$$

The derivation of equation 10 is explained in detail in the Appendix below.

FIGS. 5(*a*) to 5(*d*) and 6(*a*) to 6(*d*) illustrates the results provided by the present invention. These results were obtained by modelling synthetic seismic data for a rough-sea surface, and de-ghosting the synthetic seismic data using the method of the present invention. The synthetic seismic data were computed using the rough-sea modelling method developed by R. Laws and E. Kragh (above) and by E. Kragh and R. Laws (above). In summary, rough-sea surfaces are generated, and impulse responses beneath these surfaces are computed. The impulses are made in sets of three, and a total of 40 sets were computed with each set being computed from a different realisation of a 4 m significant wave height sea surface. Data were synthesised for a streamer depth of 6.0 m (FIGS. 5(*a*) to 5(*d*)) and a streamer depth of 10.0 m (FIGS. 6(*a*) to 6(*d*)).

The synthetic seismic data were then de-ghosted using equation (7) above to compute the vertical particle velocity. In the computation using equation (7), the parameters were set as follows: M=1, N(0)=∞ and N(1)=2, so giving $F_0$=kz cot (kz), $$F_1 = -\frac{z^2}{3}\left(1 + \frac{2}{15}k^2z^2\right), \text{ and } F_2 = 0.$$

A zero-phase Ricker wavelet with a maximum frequency of 50 Hz was convolved with the 120 pulses for estimating the $v_z$ component. In the estimation of the $v_z$ component, the well-known length-three central difference operator was used to obtain the second-order horizontal spatial derivative in the x-direction. (The calculation was performed using a 2-D estimation, so that derivatives in the cross-line direction (y-direction) become zero and may be ignored.)

Once the $v_z$ component had been estimated using equation (7), the de-ghosted pressure was determined using equation (1) above. The modelled pressure and the estimated $v_z$ component were down-sampled by a factor of 4 in time before the de-ghosted pressure was determined, thereby increasing the temporal sampling distance from 0.25 ms to 1.0 ms.

FIG. 5(*a*) shows the raw synthetic seismic data, indicated generally as A, and the results of de-ghosting the synthetic data using the Lax-Wendroff technique of Robertsson and Kragh (above), indicated as B.

Figure 5A:
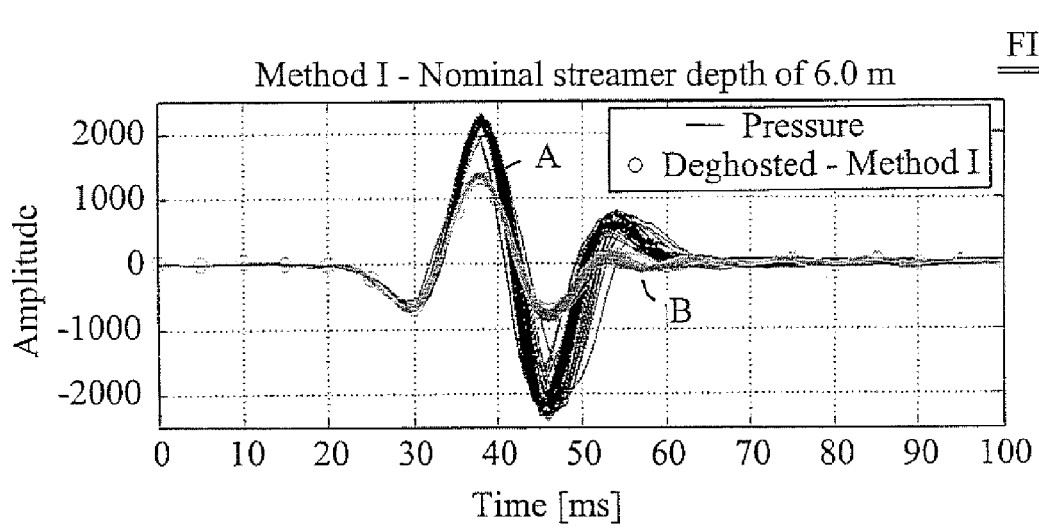
Figure 5B:
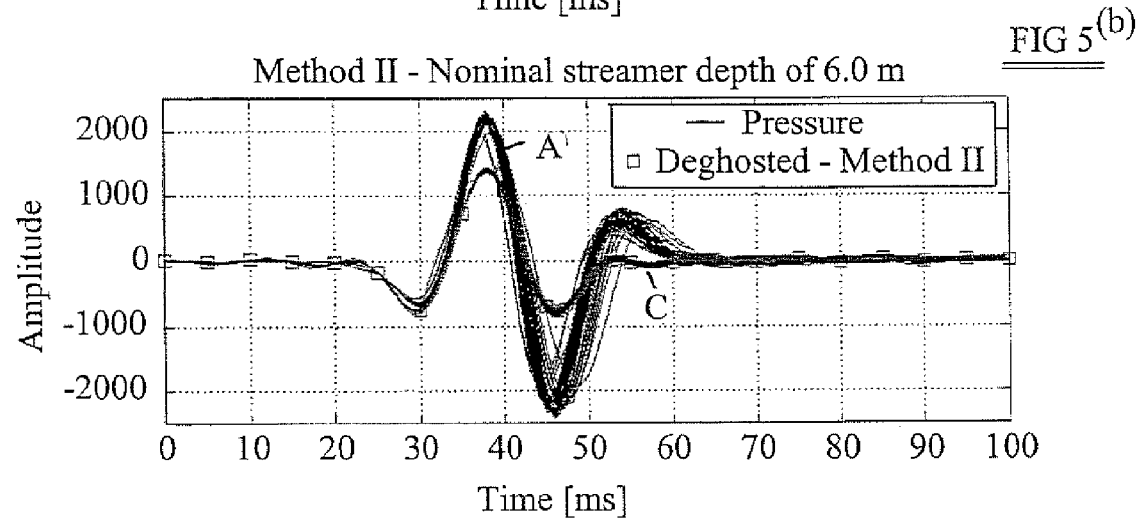
Figure 5C:
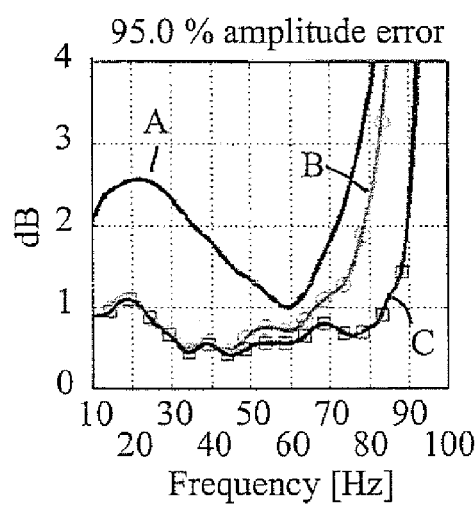
Figure 5D:
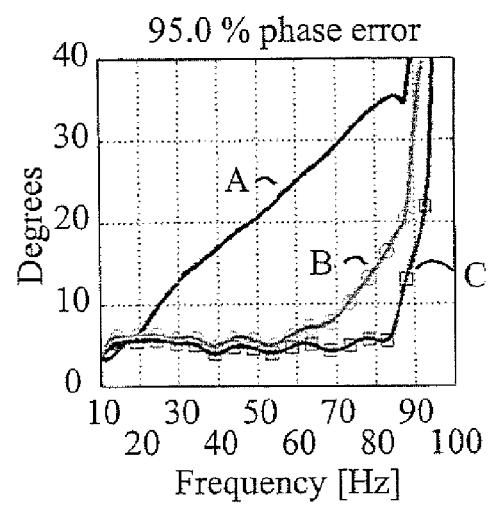

FIG. 5(b) shows the raw synthetic seismic data, indicated generally as A, and the results of de-ghosting the synthetic data using equation (7) indicated as C. FIG. 5(c) shows the 95% confidence interval in spread of the amplitude spectrum, and FIG. 5(d) shows the 95% confidence interval in the spread of the phase spectrum. The results are shown for the raw synthetic data, indicated as A, the results of de-ghosting the synthetic data using the prior art Lax-Wendroff technique, indicated as B, and the results of de-ghosting the synthetic data using equation (7) indicated as C. Although the rough-sea perturbations are not completely removed from the de-ghosted data obtained by the present invention, the correction shows a clear improvement below the first ghost-notch frequency (approximately 125 Hz). The residual error is of the order of 0.5-1.0 dB in amplitude and about 5° in phase, and these errors are significantly lower than the errors currently obtained in de-ghosting real seismic data.

FIGS. 6(a) to 6(d) correspond generally to FIGS. 5(a) to 5(d) respectively, except that they relate to a streamer depth of 10.0 m. For a streamer at this depth, the first ghost notch frequency is approximately 75 Hz.

Figure 2:
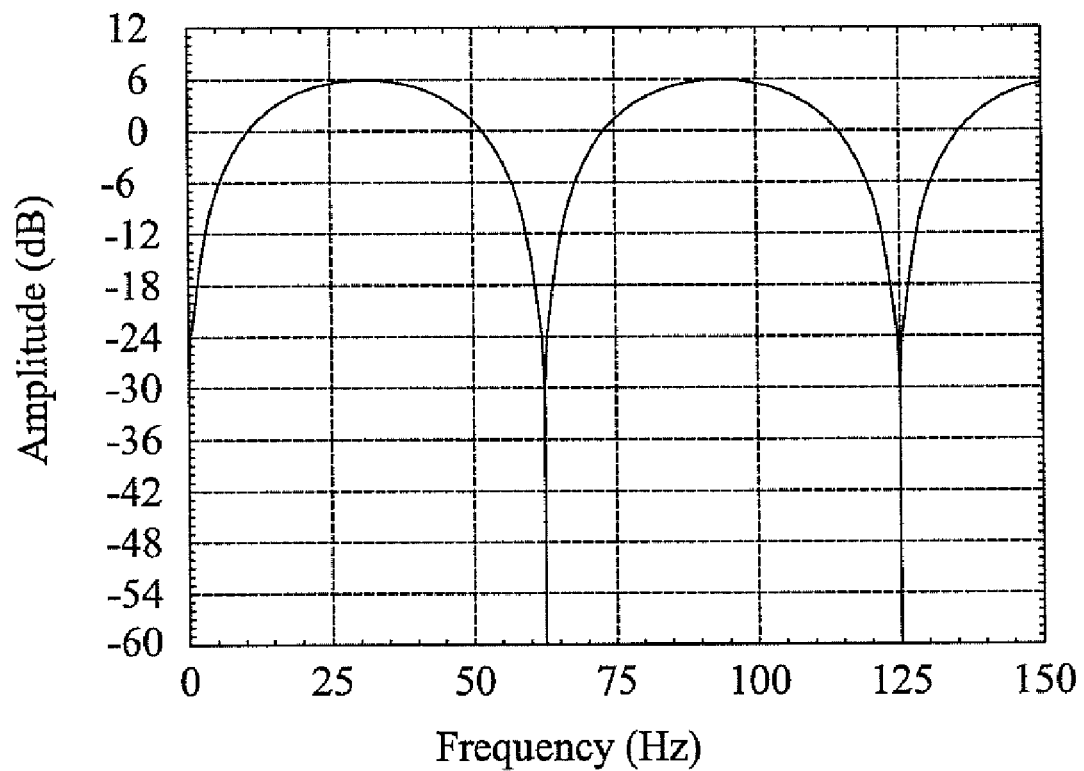
FIG. 2 illustrates the effect of ghost reflections on the amplitude spectrum of seismic energy emitted by the source in the survey of FIG. 1.

A zero-phase band pass filter with cut off frequencies of 10-15-90-100 Hz was applied to the wavelets shown in FIG. 2, whereas a zero-phase band pass filter with cut-off frequencies 10-15-65-70 was applied to the wavelets shown in FIG. 6(a) to 6(d). This has a similar effect to the bandlimited differentiation mentioned above and also below in connection with equations (A14) and (A15). Here the filter is applied to the data directly in a pre-processing step, and this has a similar overall effect.

The de-ghosted seismic data obtained by a method of the present invention may be subjected to further processing. For example, the de-ghosted data may be used to estimate the signature of the seismic source 1. This can be done, for example, according to the method proposed by L. Amundsen et al in Geophysics Vol 60, pp 212-222 (1995).

Alternatively, the de-ghosted data may be further processed to remove or at least attenuate events in the data arising from paths that involve reflection and/or scattering at the free-surface of the water column. Such events are generally known as free-surface related multiples, since they arise from paths that make multiple passes through the water column. In one embodiment, the principal steps required to remove free-surface related multiples are as follows.

Initially the direct arrival and the ghost arrival associated with the direct arrival in the incident pressure wavefield acquired at the streamer are isolated and removed from the pressure wavefield. This may be done in any suitable way, for example, by "mute" in which the direct arrival and its associated ghost arrival is simply separated from the other arrivals. Provided that the source-receiver offset is not too great and the water depth is not too shallow, the direct arrival in the seismic data, and its associated ghost arrival, are generally well separated from other arrivals.

The vertical component of the particle velocity is then estimated, according to a method as described above. The vertical component of the particle velocity is then used to separate the remaining incident pressure wavefield (i.e., the pressure wavefield remaining after the direct arrival and its associated ghost have been removed) into its up-going and downgoing components, for example using equation (1) above to determine the up-going component of the pressure wavefield.

Once the downgoing component of the remaining part of the pressure wavefield has been found, it is added to the original direct arrival and its associated ghost arrival. This gives the overall downgoing wavefield. (In a typical survey the source will be nearer the sea surface than the receiver, so that the direct arrival and its associated ghost contain only down-going energy.) Effects arising from free-surface multiple reflections may then be removed using the "U divided by D" method proposed by L. Amundsen in "Elimination of free-surface related multiples without need of the source wavelet", Geophysics, Vol. 66, pp 327-341 (2001). In this method, "U divided by D" refers to the up-going component of the wavefield remaining after removal of the direct arrival and its associated ghost arrival, divided by the overall down-going component of the wavefield. This division is essentially a deconvolution step.

The embodiments of the invention described above may be carried out on seismic data acquired by one or more pressure sensors disposed within a water column, for example on pressure data acquired by a streamer. Alternative embodiments of the invention will now be described in which the seismic data include both pressure data and particle velocity data. Such data may be acquired by, a seismic receiver, for example a streamer, that has both pressure sensors and particle velocity sensors. A streamer provided with both pressure sensors and particle velocity sensors can directly measure both the fluid pressure p and the particle velocity v.

The quantities p and v are not independent from one another, but are related by the following equations:

$$\dot{p} = -K\nabla \cdot v \qquad (11)$$

$$v = -\frac{1}{\rho}\nabla p \qquad (12)$$

In equation (11), $\dot{p}$ denotes the time-derivative of p, and K denotes the bulk modulus of the water column.

In one embodiment of the invention, it is assumed that the depth of the streamer is known. The depth may be known if, for example, the streamer is provided with depth sensors. If the streamer depth is known, it is then possible to compare the output from the particle velocity sensors with the output from the fluid pressure sensors. This comparison can be made, for example, by calculating the particle velocity from the measured values for pressure and from the depth of the streamer according to equation (2) or an equation derived therefrom, and comparing the calculated value of the particle velocity with directly measured values for the particle velocity. These values should, of course, be the same if the particle velocity and the fluid pressure have been measured accurately. This embodiment can be considered as calibrating the pressure sensors relative to the particle velocity sensors, and allows the accuracy of the sensors to be monitored.

This process for monitoring the accuracy of the sensors can be carried out while acquired seismic data is being processed by a method of the present invention. Alternatively, it can be carried out on its own, for example to check the sensors at the start of a seismic survey. This allows the extra degree of freedom provided by measuring both p and v to be used to calibrate the sensors.

In this embodiment, the depth of the streamer can be estimated, for example from knowledge of the arrangement for suspending the streamer from floats. For improved accuracy, however, it is preferable that the depth of the receiver is measured directly.

The invention may also be used to determine the depth of the receiver. To do this the vertical component of the particle velocity is determined using a method as described above. The depth of the receiver may be estimated from the measured value for the vertical component of the particle velocity and the estimated value for the vertical component of the particle velocity.

In an alternative embodiment of the invention, the vertical component of particle velocity from the pressure acquired at the receiver is determined using the following equation or an equation derived therefrom:

$$v_z(\omega, x, z) \approx F_k * p(\omega, x, z), \qquad (13)$$

$$\text{where } \tilde{F}_k = \min_{b_m, a_n} \sum_{k=-(K-1)}^{K-1} W_k \left| \frac{\Theta_{km} b_m}{\Phi_{kn} a_n} - F_k \right|^2 \qquad (14)$$

In equation (14), $a_n$ and $b_m$ denote the backward and forward filter coefficients, $W_k$ are a set of positive weights, and $F_k = F(k\Delta k_x)$ denote the desired discrete horizontal wave-number response. The derivation of equation (14) is explained in the Appendix below.

As noted above, equation (14) is an approximation of equations (A34) and (A36) given in the appendix below. Solutions to equation (14) exist for any depths. Equation (14) may be applied to data obtained with a rough sea surface, which is not possible for equations (A34) and (A36) (although they are exact for the case of a flat sea surface). As explained in the Appendix, equation (14) may be implemented to give the following zero-phase non-recursive filter:

$$\tilde{F}_k = \min_{g_m} \sum_{k=0}^{k-1} W_k |\Gamma_{km} g_m - F_k|^2 \qquad (15)$$

where $\Gamma_{km} = \cos(k \Delta k_x m \Delta x)$, $b_m = 0.5 g_m$ for $g_m = 1, 2, \ldots, M/2$ and $b_0 = g_0$.

Vertical particle velocities obtained using equations (13) and (14) or using equations (13) and (15) may be used in any of the applications described herein. Equations (13), (14) and (15) are 1-D equations, but the corresponding 2-D equations may also be used. For the 2-D case, the $F_k$ are a function of both $k_x$ and $k_y$.

The embodiments of the present invention described above have related to the de-ghosting of the signal recorded at the receiver. The invention can, however, also be used for source-side de-ghosting. In principle this could be done by directly measuring the fluid pressure at the source, but in practice it is possible to make use of the principle of reciprocity to avoid the need to do this.

The principle of reciprocity is a fundamental principle of wave propagation, and states that a signal is unaffected by interchanging the location and character of the sources and receivers. For example, if a surveying arrangement with a seismic source at point A and a receiver array at point B gives a certain signal at the receiver array, then using a single receiver at point A and a source array at point B would lead to the same signal, provided that the source array corresponds to the receiver array. (By "corresponds", it is meant that the source array contains the same number of sources as the receiver array has receivers, and that the sources in the source array are arranged in the same positions relative to one another as the receivers in the receiver array).

In consequence of the principle of reciprocity, the signal emitted by an array of seismic sources can be de-ghosted by making measurements using a receiver array, whether the seismic sources are actuated simultaneously or consecutively. The recorded signal is analogous to that recorded in a reciprocal arrangement where the source and receiver locations are interchanged. The method outlined hereinabove can therefore also be applied to the source array that it is desired to de-ghost. The signal produced at the receiver array by an array of a plurality of seismic sources is measured, and a de-ghosting filter is derived from this measured signal. By the principle of reciprocity, this filter can be used to de-ghost the signal emitted by the source array.

The methods described in this application are fast, and it is possible to process a complete trace using a method of the invention. If desired, however, the methods may be applied to a selected part of a trace.

FIG. 7 shows a twin streamer seismic surveying arrangement in which two streamers are disposed with a water column at different depths below the surface of the water column. Components having the same references in FIG. 7 as in FIG. 1 correspond to the components described above with reference to FIG. 1, and the description of these components will not be repeated.

In the seismic surveying arrangement of FIG. 7, a first streamer 2 is suspended within the water column. A second streamer 2' is suspended below the first streamer 2. The second streamer 2' is deployed so as to be nominally vertically below the first streamer 2, although the action of tides and currents may mean that the second streamer is not always exactly vertically below the first streamer. The streamers are deployed such that the first streamer is deployed at a nominal depth z, below the surface 6 of the water column and the second streamer is deployed at a nominal depth $z_2$ (where $Z_2 > Z_1$) below the surface 6 of the water column. Again, the action of tides and currents, and the effect of surface waves, may mean that the first and second streamers are not always at exactly their nominal depths; the separation between the streamers may also vary form the intended value of $\Delta z$ (where $\Delta z = z_2 - Z_1$).

A plurality of pressure sensors is disposed along each streamer, with the upper streamer 2 having pressure sensors S1, S2 ... SN up to a total of N pressure sensors and the lower streamer 2' having pressure sensors S'1, S'2 ... S'M up to a total of M pressure sensors. Each streamer may have the same number of pressure sensors (in which case N=M). One or both of streamers may also be provided with other sensors such as, for example, particle velocity sensors.

The seismic surveying arrangement also comprises an apparatus 20 for processing seismic data acquired by the sensors on the streamers 2,2' as a result of actuating the source array 1 to emit seismic energy. The processing apparatus may be located, for example, on shore, on the towing vessel, or on another vessel. Data acquired at the sensors on the streamers may for example be transmitted to a storage means (for example located on the towing vessel) by, for example, an electrical, optical or wireless link (not shown), and may subsequently be passed to the processing apparatus. Alternatively, data acquired at the sensors may be stored for subsequent retrieval in storage means provided on the streamers.

There is a known method of estimating the up-going pressure at the upper streamer from the pressure measurements acquired at the pressure sensors on the two streamers (see equation A41 of the appendix). However, this prior method is limited to the case of horizontal streamers having a constant vertical separation.

The method of the present invention makes it possible to obtain an estimate of the vertical component of the particle velocity at the upper streamer from the pressure measurements acquired at the pressure sensors on the two streamers. The vertical component of the particle velocity at the upper streamer may be found from the acquired pressure measurements according to:

$$v_z(\omega, k_x, k_y, z_1) = \frac{ik_z}{\rho\omega}\cot(k_z\Delta z)p(\omega, k_x, k_y, z_1) - \frac{ik_z}{\rho\omega\sin(k_z\Delta z)}p(\omega, k_x, k_y, z_2). \quad (16)$$

As explained in the Appendix, equation (16) may be approximated as:

$$v_z(\omega, k_x, k_y, z_1) = \frac{i}{\rho\omega\Delta z}\sum_{m=0}^{\infty}(-1)^m F_m^{(1)}\kappa^{2m}p(\omega, k_x, k_y, z_1) - \frac{i}{\rho\omega\Delta z}\sum_{m=0}^{\infty}(-1)^m F_m^{(2)}\kappa^{2m}p(\omega, k_x, k_y, z_2). \quad (17)$$

In the simplest approximation of equation (17), only the lowest term is retained in each summation—that is, $F_0^{(1)}$ in the first summation and $F_0^{(2)}$ in the second summation. This is equivalent to the known "shift and sum" technique. According to the invention, however, the particle velocity is estimated in a higher order approximation, in which at least one more term is retained in at least one of the summations. It is possible to obtain an estimate of the vertical particle velocity at the lower streamer or at other locations that do not coincide with either streamer in a similar way using equivalent equations readily apparent to those skilled in the art.

In a particularly preferred-embodiment of the invention, the first two terms are retained in each summation, so that $F_0^{(1)}$ and $F_1^{(1)}$ are retained in the first summation and $F_0^{(2)}$ and $F_1^{(2)}$ are retained in the second summation. This can be implemented with a 3-point running filter.

FIGS. 8(a) to 8(d) show results for the 3-point filter approximation in which the first two terms are retained in each summation of equation (17). FIGS. 8(a) to 8(d) show how the simple "shift & sum" approximation and the more accurate 3-point filter approximation compare to the true solution for estimating vertical particle velocity in a twin-streamer configuration as given by equation (16). Since equations (16) and (17) contain two terms with one filter being applied to the shallower streamer data and one filter being applied to the deeper streamer data, FIGS. 8(a) to 8(d) show the results for the two terms separately.

FIGS. 8(b) and 8(d) show the difference between the "true" solution for estimating the vertical component of the particle velocity from equation (16) (as obtained using a numerical technique) and the "shift & sum" approximation of equation (17) using just the first term in each summation. The results were obtained for a constant streamer separation of 7 m. FIG. 8(b) shows the difference between the "true" solution and the "shift and sum" approximation for the first term (the term in the pressure at the upper streamer) and FIG. 8(d) shows the difference between the "true" solution and the "shift and sum" approximation for the second term (the term in the pressure at the lower streamer).

FIGS. 8(a) and 8(c) show the difference between the "true" solution for estimating the vertical component of the particle velocity from equation (16) using a numerical technique and the 3-point filter approximation of equation (17) using the first two terms in each summation. The results were again obtained for a constant streamer separation of 7 m. FIG. 8(a) shows the difference between the "true" solution and the 3-point filter approximation for the first term (the term in the pressure at the upper streamer) and FIG. 8(c) shows the difference between the "true" solution and the 3-point filter approximation for the second term (the term in the pressure at the lower streamer).

The differences shown in FIGS. 8(a) and (b) have been normalised against the absolute value of the first term (the term in the pressure at the upper streamer) in the true solution. The differences shown in FIGS. 8(c) and (d) have been normalised against the absolute value of the second term (the term in the pressure at the lower streamer) in the true solution.

It will be seen that, although the "shift & sum" algorithm is a reasonable approximation, especially at low wave numbers, the 3-point filter approximation provides better results.

The regions of FIGS. 8(a) and 8(c) in which the difference between the 3-point filter approximation and the true solution is significant are indicated in the Figures and are considerably smaller than the regions of FIGS. 8(b) and 8(b) in which the difference between the shift and sum approximation and the true solution is significant.

A further advantage of the invention is that it may be applied even if the vertical separation between the streamers varies over the length of the streamers. It is not limited to the case of a constant separation between the streamers.

As explained above, if the upper streamer is provided with particle velocity sensors it is possible to compare the measured value for $v_z$ with the value for $v_z$ obtained from equation (17), for example by using the 3-point filter approximation. This allows the depth of the streamer to be determined, or allows the particle velocity sensors to be calibrated as explained above.

As also explained above, the value for $v_z$ obtained from equation (17), for example by using the 3-point filter approximation, may be used in de-ghosting the seismic data acquired at the streamers or it may be used to eliminate effects of the source signature.

A further application of the twin streamer seismic surveying arrangement of FIG. 7 is in the use of a Lax-Wendroff technique to obtain the vertical component of the particle velocity from pressure acquired at the streamers. The vertical component of the particle velocity is equivalent to the vertical pressure gradient $\partial p/\partial z$, and the Lax-Wendroff technique allows the vertical pressure gradient $\partial p/\partial z$ to be obtained from the time derivative of the pressure and from $\partial p/\partial x$ which is the derivative of the pressure along the streamer. The Lax-Wendroff technique is described in PCT/IB01/01150, the contents of which are incorporated by reference.

PCT/IB01/01150 gives the following equation for the vertical pressure gradient at a point $(x_0, z_0)$ below the surface of a water column:

$$\partial_z p(x_0, z_0) = \frac{p(x_0, z_0) - p(x_0, z_0 - h)}{h} + \frac{h}{2}\partial_{zz}p(x_0, z_0) + O(h^2) \quad (18)$$

In equation (18), h denotes the vertical distance of the streamer at a point $(x_0, z_0)$ below the surface of the water column. PCT/IB01/01150 simplifies equation (18) by using the fact that the pressure vanishes at the surface of the water column so that $p(x_0,z_0-h)$ is zero, and by replacing the term in $\partial_{zz}p(x_0,z_0)$ according to:

$$\partial_{zz}p(x_0,z_0) = \frac{1}{\alpha^2}\ddot{p}(x_0,z_0) - \partial_{xx}p(x_0,z_0) \tag{19}$$

In the twin streamer case, pressure data is available at two depths. Equation (18) may be applied to the twin streamer case, by setting h equal to $\Delta z(=z_1-z_2)$. The pressure acquired at the pressure sensors on the two streamers provides the two terms in p in equation (18), and the term in $\partial_{zz}p$ may be estimated from the pressure acquired at different sensors along a streamer.

Thus, the invention provides a further method of determining the vertical component of particle velocity from pressure measurements made using a twin streamer arrangement. In this method pressure measurements acquired at n pressure sensors on the upper streamer 2, where 1<n<N, and pressure measurements acquired at m pressure sensors on the lower streamer 2', where 1<m<M, are used in the determination of the vertical component of particle velocity.

FIG. 9 is a schematic block diagram of an apparatus 20 that is able to perform a method according to the present invention.

The apparatus 20 comprises a programmable data processor 21 with a program memory 22, for instance in the form of a read only memory (ROM), storing a program for controlling the data processor 21 to process seismic data by a method of the invention. The apparatus further comprises non-volatile read/write memory 23 for storing, for example, any data which must be retained in the absence of a power supply. A "working" or "scratch pad" memory for the data processor is provided by a random access memory RAM 24. An input device 25 is provided, for instance for receiving user commands and data. One or more output devices 26 are provided, for instance, for displaying information relating to the progress and result of the processing. The output device(s) may be, for example, a printer, a visual display unit, or an output memory.

The seismic model, the parameters of a seismic surveying arrangement and the prior AVO information may be supplied via the input device 25 or may optionally be provided by a machine-readable data store 27.

The results of the processing may be output via the output device 26 or may be stored.

The program for operating the system and for performing the method described hereinbefore is stored in the program memory 22, which may be embodied as a semiconductor memory, for instance of the well known ROM type. However, the program may well be stored in any other suitable storage medium, such as a magnetic data carrier 22a (such as a "floppy disk") or a CD-ROM.

APPENDIX

Robertsson and Kragh (above) have shown that the vertical component of the particle velocity, $v_z$, can be estimated from the raw measurements of the pressure field, p. In the typical seismic frequency band one possible approximation given is $$v_z(\omega,x,y,z) = \tag{A1}$$
$$-\frac{i}{\rho\omega z}\left[A'_{00} + A'_{10}(kz)^2 + A'_{11}z^2\left(\frac{\partial^2}{\partial x^2} + \frac{\partial^2}{\partial y^2}\right)\right]p(\omega,x,y,z),$$

with scalars $A'_{00} = 1$; $A'_{10} = -1/2$; $A'_{11} = -1/2$, (A2)

In equation (A1) $\omega$ is the (angular) frequency, $k=\omega/\alpha$ is the wavenumber, $\alpha$ is the P-wave velocity, $\rho$ is the density, and $z=z(x,y)$ is the streamer depth. According to Robertsson and Kragh, approximation requires that the streamer is towed no deeper than approximately $\lambda/3.5$, where $\lambda$ is the minimum wavelength, and that the receiver spatial sampling interval is around 3 m or less. This method is fundamentally limited to frequencies below the first ghost notch. For instance, for a streamer depth of 6 m, equation (A1) is accurate up to approximately 70 Hz.

For densely sampled pressure measurements one attractive feature of method (A1) is that the filters for estimating the vertical particle velocity are local and short. By approximating the second-order horizontal spatial derivatives by three-point central difference-operators, the spatial filter has cross structure with five coefficients. Processing single streamer pressure data such as those provided by the new Q-Marine streamers under the 2.5D earth model, the filter has three coefficients only. Thus, to estimate the vertical particle velocity at a particular receiver location, only the pressure field at this and the two neighbouring receivers are required. Provided the depth of the (near-horizontal) streamers below the sea surface are known at all points along the streamers, equation (A1) gives a methodology of estimating the vertical particle velocity field in rough-sea environments. Let P and $V_z$ denote the spatial Fourier transforms of p and $v_z$, respectively. The estimate given in equation (A1) then can be combined with the raw pressure measurements to deghost the data (see e.g. L. Amundsen in Geophysics Vol. 56, pp 1027-1039 (1993) or UK patent application No. 9906456.0)

$$\tilde{P}(\omega,k_x,k_y,z) = \frac{1}{2}\left[P(\omega,k_x,k_y,z) - \frac{\rho\omega}{k_z}V_z(\omega,k_x,k_y,z)\right], \tag{A3}$$

where $\tilde{P}(\omega,k_x,k_y,z)$ denotes the deghosted (up-going) pressure, $k_z=\sqrt{k^2-\kappa^2}$ is the vertical wavenumber, $\kappa^2=k_x^2+k_y^2$ and $k_x$ and $k_y$ are the horizontal wavenumbers. Equation (3) is valid for all wavenumbers. Alternatively, approximations to equation (A3) as those suggested by A. Osen et al. in "Towards optimal spatial filters for demultiple and wavefield splitting of ocean bottom seismic data", submitted to Geophysics (2002).

In the present application the accuracy of the vertical particle velocity field approximation given in equation (A1) is extended by introducing optimised filters. L. Amundsen et al. derived, in Geophysics Vol. 60, pp 212-222 (1995) an exact frequency-wavenumber domain relationship between the vertical component of the particle velocity and the pressure field. For single streamer data the relationship is:

$$V_z(\omega,k_x,k_y,z) = -\frac{k_z}{\rho\omega}\left(\frac{\exp(-ik_zz) + \exp(ik_zz)}{\exp(-ik_zz) - \exp(ik_zz)}\right)\cdot P(\omega,k_x,k_y,z) \tag{A4}$$

Equation (A4) is valid for all streamer depths z in the water column when the receiver cable is horizontal and the air/water surface is flat with vanishing pressure. Essentially, the equation shows that to find the vertical component of the particle velocity from the pressure field, first the pressure has to be receiver-deghosted, then the receiver ghost operator for the vertical component of the particle velocity is applied. (Taking into account that the reflection coefficient of the free surface is −1, the ghost operator for the pressure is $1-\exp(2ik_z z)$ since the pressure is the sum of upgoing and downgoing waves, whereas the ghost operator for the vertical particle velocity is $1+\exp(2ik_z z)$ since the vertical particle velocity is proportional to the difference between upgoing and downgoing waves.) Note that when the source depth is less than the receiver depth the incident pressure wavefield (the sum of the direct pressure wavefield and its ghost) does not contain a receiver ghost, but only a source ghost. Since equation (A4) relies on receiver deghosting, it cannot correctly treat the incident wavefield. This is of minor importance in receiver deghosting of streamer data. When the source depth is greater than the receiver depth, however, the incident pressure wavefield contains a receiver ghost as do the reflected part of the pressure field. In this case, equation (A4) is valid for the fall pressure wavefield.

Equation (A4) can be rewritten as $$V_z(\omega, k_x, k_y, z) = -\frac{i}{\rho\omega z}\sum_{m=0}^{\infty}(-1)^m F_m(k, z)\kappa^{2m} \cdot P(\omega, k_x, k_y, z), \quad (A5)$$

with horizontal wavenumber ($\kappa$) independent functions $$F_m = F_m(k, z) = k^{-2m}\sum_{n=m}^{\infty} A_{nm}(kz)^{2n} \quad (A6)$$

where $$A_{nm} = \frac{(-1)^n 2^{2n} B_{2n}}{(2n)!}\binom{n}{m} \quad (A7)$$

are scalars, $B_n$ is the n:th Bernoulli number, and n! is the factorial of n. All functions $F_m$ can be given in compact form. For instance, $$F_0 = kz\cot(kz) = -ikz\left(\frac{\exp(-ikz) + \exp(ikz)}{\exp(-ikz) - \exp(ikz)}\right) \quad (A8)$$

$$F_1 = \frac{z}{2k}\frac{\partial}{\partial(kz)}F_0, \quad (A9)$$

$$F_2 = \frac{z}{4k^3}\left(\frac{\partial}{\partial(kz)}kz - 2\right)\frac{\partial}{\partial(kz)}F_0. \quad (A10)$$

The function $F_0$ ensures that vertically propagating waves ($k_x=k_z=0$) are correctly deghosted.

Taking an inverse Fourier transform of equation (A5) over horizontal wavenumbers gives $$v_z(\omega, x, y, z) = -\frac{i}{\rho\omega z}\sum_{m=0}^{\infty} F_m(k, z) D_2^m(x, y) * p(\omega, x, y, z), \quad (A11)$$

where $D_2$ is the inverse Fourier transform of $\kappa^2$, and * is the 2D spatial convolution operator. For infinite bandwidth, $$D_2(x, y) = D_2(x) + D_2(y), \quad (A12)$$

where $$D_2(x) = \frac{\partial^2}{\partial x^2}; \quad D_2(y) = \frac{\partial^2}{\partial y^2}, \quad (A13)$$

are second-order spatial differentiation operators. Differentiation however involves large amplification of high wavenumbers. Hence, in practical situations a bandlimited version of differentiation is preferably used. Let $d_2$ denote a bandlimited version of $D_2$. Two possible bandlimited differentiation operators are $$d_2(x) = \frac{1}{\Delta x}[\delta(x + \Delta x) - 2\delta(x) + \delta(x - \Delta x)], \quad (A14)$$

where $\Delta x$ is the spatial sampling interval, or $$d_2(x, \omega) = \frac{1}{\pi}\int_0^K dk_x \cos(k_x x) W(\omega, k_x)(-k_x^2), \quad (A15)$$

where W is a weighting function that properly bandlimits the differentiation operator. Note that W can be changed per frequency component. In equation (A15) K is the maximum wavenumber. Two possible choices are $K=\omega/c$, where c is the velocity of water, or $K=\pi/\Delta x$, the Nyquist wavenumber.

Note that equation (A11) is valid for all receiver depths z in the water column. Also, observe that the scheme is iterative:

$$D_2^m * p = D_2^m * (D_2^{m-1} * p); D_2^0 = 1 \quad (A16)$$

This recursive property allows equation (A11) to be implemented with numerical efficiency. For dense spatial sampling the differentiators $D_2(x)$ and $D_2(y)$ can be approximated by filters of length three [see equation (A14)]. A properly designed, bandlimited, second-order differentiator $d_2(x)$ is imperative for obtaining a stable iterative scheme.

Special Case I: Finite m

A special case of equation (A11) arises when m is finite, say M. Then, for infinite bandwidth, $$v_z(\omega, x, y, z) \approx -\frac{i}{\rho\omega z}\sum_{m=0}^{M} F_m(k, z)\left(\frac{\partial^2}{\partial x^2} + \frac{\partial^2}{\partial y^2}\right)^m p(\omega, x, y, z), \quad (A17)$$

where $F_m$ is given in equation (A6) as an infinite series. However, the function $F_m$ can also be given analytically in terms of trigonometric functions. Examples are $F_0$, $F_1$, and $F_2$ given in equations (A8), A(9), and (A10), respectively.

Observe that the assumption of flat sea surface used to derive equation (4) can now be relaxed. In equation (A17) the x and y variables are decoupled from z, implying that it is valid also for a rough sea surface.

Equation (A17) can be numerically implemented in different ways. The preferred implementation depends on the spatial sampling interval for the pressure field. For densely sampled data one would typically represent the spatial derivatives by classical central finite-difference approximations. If M is small, the filter is then local and compact. As an example, choosing M=2 gives for infinite bandwidth, $$v_z(\omega, x, y, z) \approx \qquad (A18)$$
$$-\frac{i}{\rho \omega z}\left[F_0 + F_1\left(\frac{\partial^2}{\partial x^2} + \frac{\partial^2}{\partial y^2}\right) + F_2\left(\frac{\partial^2}{\partial x^2} + \frac{\partial^2}{\partial y^2}\right)^2\right] p(\omega, x, y, z).$$

Approximating the second-order spatial derivatives by a three-point finite difference operator the iterative filter is of length three. Since the functions $F_0$, $F_1$ and $F_2$ are valid for all receiver depths, equation (A18) is more general than equation (A1), and is preferred for rough-sea deghosting.

For a coarser receiver interval the horizontal derivatives are most conveniently implemented as numerically optimised difference operators or by use of Fourier techniques.

Special Case II: Finite m, n

Limiting the sums over m in equation (11) and it in equation (A6) from infinity to M and N(m), respectively, gives for infinite bandwidth the approximation with $$v_z(\omega, x, y, z) \approx \qquad (A19)$$
$$-\frac{i}{\rho \omega z}\sum_{m=0}^{M} F_m(k, z)\left(\frac{\partial^2}{\partial x^2} + \frac{\partial^2}{\partial y^2}\right)^m p(\omega, x, y, z),$$

with $$F_m \approx k^{-2m}\sum_{n=m}^{N(m)} A_{nm}(kz)^{2n} \qquad (A20)$$

Choosing $M = 1$, $N(0) = 2$, and $N(1) = 1$, gives $$F_0 \approx 1 - \frac{(kz)^2}{3}, \qquad (A21)$$

$$F_1 \approx -\frac{z^2}{3} \qquad (A22)$$

and $$v_z(\omega, x, y, z) \approx \qquad (A23)$$
$$-\frac{i}{\rho \omega z}\left[A_{00} + A_{10}(kz)^2 + A_{11}z^2\left(\frac{\partial^2}{\partial x^2} + \frac{\partial^2}{\partial y^2}\right)\right] p(\omega, x, y, z),$$

with scalars $$A_{00} = 1; \quad A_{10} = -1/3; \quad A_{11} = -1/3. \qquad (24)$$

Equation (A23) has the same structure as equation (A1) proposed by Robertsson and Kragh (above). The scalars $A_{10}$ and $A_{11}$, however, differ from the scalars $A_{10}'$ and $A_{11}'$ in equation (A1). In many respects the limitations of equation (A23) are similar to those of the formula of Robertsson and Kragh (above). However, equations (A11), (A17), and (A19) are general and one significant difference is that they are valid for all streamer depths, whereas the theory derived by Robertsson and Kragh (above) requires that the streamer is towed no deeper than approximately $\lambda/3.5$, where $\lambda$ is the minimum wavelength.

If we choose M=1, N(0)=∞ and N(1)=2, this results in $F_0$=kz cot(kz) and $$F_1 = -\frac{z^2}{3}\left(1 + \frac{2}{15}k^2 z^2\right).$$

Data Processing of Single Streamer Data

Equations (A11), (A17) and (A19) above include derivatives in the y-direction or cross-line direction (the streamer(s) is/are assumed to extend along the x-direction). In a seismic surveying arrangement that includes only a single streamer it is not clear how the cross-line derivatives in the y-direction that occur in the above equations may be determined from the seismic data acquired by the receivers on the streamer. It will be noted, however, that only even powers (second-order, fourth-order, sixth-order, etc.) spatial derivatives occur. Finding an expression for the second-order spatial derivative is therefore sufficient.

Figure 4:
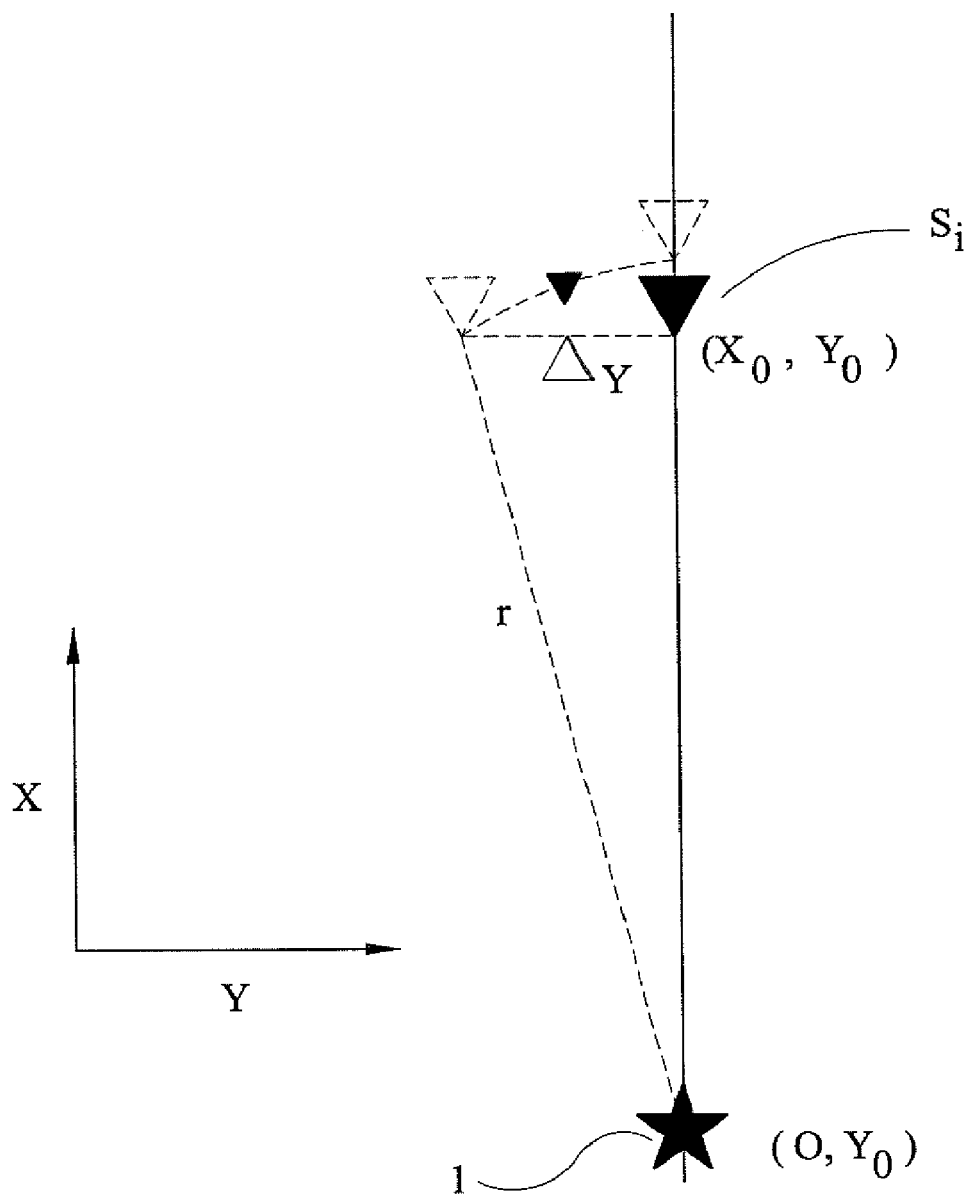
FIG. 4 is a schematic plan view of the seismic surveying arrangement of FIG. 1.

Consider the single streamer geometry shown in FIG. 4, which is a schematic plan view of the seismic surveying arrangement of FIG. 1. The seismic source 1 is located at coordinates $(O, y_0)$ in the x-y plane. The streamer extends along the x-axis, and has a y-coordinate $y_0$. One of the receivers $S_i$ is located at coordinates $(x_0, y_0)$, and it assumed that the source 1 and the receiver $S_i$ are located in the same z-plane in an acoustic layer. It will be assume that the model only varies with depth, and does not vary with x or y. By using a finite-difference approximation to a second-order derivative, it is possible to write the following equation for the pressure p:

$$\frac{\partial^2}{\partial y^2} p(x_0, y_0) = \qquad (A25)$$
$$\frac{1}{\Delta y^2}(p(x_0, y_0 + \Delta y) - 2p(x_0, y_0) + p(x_0, y_0 - \Delta y)) + O(\Delta y^2),$$

where $O(\Delta y^2)$ expresses the leading error term in the finite-difference approximation. However, because of radial symmetry the recorded pressure is the same on either side of the receiver so that equation (A25) becomes $$\frac{\partial^2}{\partial y^2} p(x_0, y_0) = \frac{2}{\Delta y^2}(p(x_0, y_0 + \Delta y) - p(x_0, y_0)) + O(\Delta y^2). \qquad (A26)$$

Radial symmetry also yields $$p(x_0, y_0 + \Delta y) = p(x_0\sqrt{1 + (\Delta y/x_0)^2}, y_0)$$

so that equation (A26) becomes:

$$\frac{\partial^2}{\partial y^2} p(x_0, y_0) = \qquad (A28)$$
$$\frac{2}{\Delta y^2}\left(p\left(x_0\sqrt{1 + (\Delta y/x_0)^2}, y_0\right) - p(x_0, y_0)\right) + O(\Delta y^2).$$

By using a first-order one-sided finite-difference approximation in the x-direction it is possible to write equation (A28) as:

$$\frac{\partial^2}{\partial y^2} p(x_0, y_0) = \frac{2x_0\left(\sqrt{1+(\Delta y/x_0)^2}-1\right)}{\Delta y^2} \left(\frac{\partial}{\partial x} p(x_0, y_0) + O\left(\sqrt{1+(\Delta y/x_0)^2}-1\right)\right) + O(\Delta y^2) \tag{A29}$$

Taking a Taylor series expansion of the square root:

$$\sqrt{1+(\Delta y/x_0)^2} = 1 + \frac{1}{2}(\Delta y/x_0)^2 + O(\Delta y^4), \tag{A30}$$

equation (A29) may be re-written as, $$\frac{\partial^2}{\partial y^2} p(x_0, y_0) = \tag{A31}$$

$$\frac{2x_0\left(\frac{1}{2}(\Delta y/x_0)^2 + O(\Delta y^4)\right)}{\Delta y^2}\left(\frac{\partial}{\partial x} p(x_0, y_0) + O(\Delta y^2)\right) + O(\Delta y^2).$$

Further simplification of equation (31) yields $$\frac{\partial^2}{\partial y^2} p(x_0, y_0) = \frac{1}{x_0}\frac{\partial}{\partial x} p(x_0, y_0) + O(\Delta y^2). \tag{A32}$$

Finally, we let $\Delta y \to 0$ so that:

$$\frac{\partial^2}{\partial y^2} p(x_0, y_0) = \frac{1}{x_0}\frac{\partial}{\partial x} p(x_0, y_0). \tag{A33}$$

For pressure data over a horizontally layered medium there is no problem with the singularity in equation (33) since $$\frac{\partial}{\partial x} p(x_0, y_0)$$

goes to zero faster than the singularity $1/x_0$ goes to infinity.

Equation (A33) is consistent with what is valid for cylindrical symmetry (data over a horizontally layered medium). An alternative approach would therefore be to multiply the data with $\sqrt{t}$, where t is time, and use the 2D version of the theory derived in this application as well as in UK patent application No. 0015810.5. However, equation (A33) can potentially give more accurate results.

It should be noted the above approach may not be reliable for a medium that is not simply plane layered since there can be a problem because p is not symmetric with respect to x.

Complex Frequency

In the implementation of the filters we use complex frequencies to avoid the singularities in the functions $F_m$ as given e.g. in equations (8), (9), and (10) for M=0,1,2, respectively. The use of a complex-frequency is described by, for example, S. Mallick and L. N. Frazer in Geophysics Vol. 52, pp 1355-1364 (1987) and by L. Amundsen and B. Ursin in Geophysics Vol. 56, pp 1027-1039 (1991).

On $V_z$-Estimation using Numerically Optimised Spatial Filters

1. Introduction

In this section, we introduce numerically optimised spatial filters for the estimation of the vertical particle velocity field. Amundsen et al. (1995, above) derived an exact frequency-wavenumber domain relationship between the vertical component of the particle velocity and the pressure field. For single streamer data the relationship in the 2D case is $$v_z(\omega, k_x, z) = -\frac{k_z}{\rho\omega}\left[\frac{\exp(-ik_z z)+\exp(ik_z z)}{\exp(-ik_z z)-\exp(ik_z z)}\right]\cdot p(\omega, k_x, z) \tag{A34}$$

Equation (A34) may be re-written as:

$$v_z(\omega, k_x, z) = F(\omega, k_x, z)\cdot p(\omega, k_x, z) \tag{A35}$$

where the $v_z$-estimation filter is given by:

$$F(\omega, k_x, z) = -\frac{k_z}{\rho\omega}\left[\frac{\exp(-ik_z z)+\exp(ik_z z)}{\exp(-ik_z z)-\exp(ik_z z)}\right] \tag{A36}$$

In the frequency-space domain, equation (A34) is written symbolically as $$V_z = \tilde{F} * p \tag{A37}$$

where * denotes spatial convolution.

2. Optimisation Problem Formulation

The discrete horizontal wavenumber response of a spatial digital filter can be written as:

$$\tilde{F}_k = \tilde{F}(k\Delta k_x) = \frac{\sum_{m=-M/2}^{M/2} b_m \exp(-ik\Delta k_x m\Delta x)}{\sum_{n=0}^{N} a_n \exp(-ik\Delta k_x n\Delta x)} = \frac{\Theta_{km}b_m}{\Phi_{kn}a_n} \tag{A38}$$

where $a_n, b_m$ are the backward and forward filter coefficients with N,M the respective filter orders. Without loss of generality, M and N are assumed to be even numbers and $a_0 \equiv 1$. Furthermore, $\Delta x$ is the spatial sampling interval and $\Delta k_x = \pi/[\Delta x(K-1)]$ is the distance between the discrete horizontal wavenumbers. If $F_k = F(k\Delta k_x)$ denotes the desired discrete horizontal wavenumber response, then the design of the spatial filters can be stated as a general weighted non-linear least-squares optimisation problem:

$$\tilde{F}_k = \min_{b_m, a_n} \sum_{k=-(K-1)}^{K-1} W_k \left|\frac{\Theta_{km}b_m}{\Phi_{kn}a_n} - F_k\right|^2 \tag{A39}$$

where $W_k$ is a set of positive weights. In the following, the optimisation problem is formulated for propagating waves only, for which the ideal decomposition filter is purely real (i.e., zero-phase). Let κ denote the index corresponding to a discrete horizontal wavenumber close to the critical wavenumber.

3. Zero-Phase FIR Filters

For a zero-phase non-recursive or finite impulse response (FIR) filter, the forward filter coefficients are symmetric and the backward filter order is zero. This reduces the non-linear least-squares optimisation problem given in equation (A39) to the following linear-least squares optimisation problem:

$$\min_{g_m} \sum_{k=0}^{\kappa-1} W_k |\Gamma_{km} g_m - F_k|^2 \tag{A40}$$

where $\Gamma_{km} = \cos(k\Delta k_x m\Delta x)$. The $g_m$'s are related to the $b_m$'s by $b_m = 0.5\, g_m$ for $g_m = 1, 2, \ldots, M/2$ and by $b_0 = g_0$.

4. Quadratic Programming

The linear least-squares optimisation problem shown in equation (A40) is unconstrained, and unique and optimal solutions are given by the pseudo-inverses. Nevertheless, it can be important that the magnitude responses of the optimal FIR filter have zero-error at particular horizontal wavenumbers, or that they have magnitude responses smaller than a given function for a certain horizontal wavenumber range. The combination of a linear least-squares optimisation problem with linear equality and/or inequality constraints is called Quadratic Programming (QP) and can be solved efficiently with many different algorithms.

For example, a single equality constraint can be included at zero horizontal wavenumber to ensure that propagating waves are estimated correctly by the optimal FIR filter. In addition, linear inequality constraints can be included in the evanescent horizontal wavenumber range to force the spatial filter's magnitude response of the ideal decomposition filter. This prevents boosting of evanescent waves by the numerically optimised spatial filters.

5. Twin Streamers

In this section we describe how to filter data recorded in twin-streamer configurations to obtain an estimate of particle velocity at the uppermost streamer. The advantage of the proposed technique is that a compact filter is achieved which is suitable when the streamer separation varies along the streamers. Once the particle velocity has been estimated, it can be combined with the pressure recording as described by for instance PCT application PCT/GB00/01074 (see equation (A43) below) to separate the recorded data into its up- and down-going components.

Theory

L. Amundsen gives, at "Wavenumber-based filtering of marine point-source data", Geophysics, Vol. 58, pp 1335-1348 (1993), an expression for the up-going pressure $\tilde{p}(\omega, k_x, k_y, z_1)$ at the shallowest streamer in a twin-streamer configuration with two horizontal streamers with a constant vertical separation:

$$\tilde{p}(\omega, k_x, k_y, z_1) = \tag{A41}$$
$$\frac{\exp(ik_z \Delta z) p(\omega, k_x, k_y, z_2) - \exp(2ik_z \Delta z) p(\omega, k_x, k_y, z_1)}{1 - \exp(2ik_z \Delta z)},$$

where $p(\omega, k_x, k_y, z_2)$ and $p(\omega, k_x, k_y, z_1)$ denote the recorded pressure at the deepest and shallowest streamers, respectively, $\Delta z$ is the vertical streamer separation, $\omega$ is the angular frequency, $k_z = \sqrt{k^2 - \kappa^2}$ is the vertical wavenumber, $\kappa^2 = k_x^2 + k_y^2$, and $k_x$ and $k_y$ are the horizontal wavenumbers. Equation (A41) can be expanded as:

$$\tilde{p}(\omega, k_x, k_y, z_1) = \frac{1}{2}\Big(p(\omega, k_x, k_y, z_1) + \tag{A42}$$
$$\frac{i}{\sin(k_z \Delta z)} p(\omega, k_x, k_y, z_2) - i\cot(k_z \Delta z) p(\omega, k_x, k_y, z_1)\Big).$$

The up-going pressure at the shallowest streamer can also be expressed in terms of pressure and vertical particle velocity recordings $v_z(\omega, k_x, k_y, z_1)$ at the shallowest streamer as:

$$\tilde{p}(\omega, k_x, k_y, z_1) = \frac{1}{2}\Big[p(\omega, k_x, k_y, z_1) - \frac{\rho\omega}{k_z} v_z(\omega, k_x, k_y, z_1)\Big], \tag{A43}$$

(e.g., Amundsen 1993 (above) or PCT/GB00/01074) where ρ is the density. By identification of terms between equations (A42) and (A43) we obtain an expression for vertical particle velocity along the shallowest streamer in terms of recorded pressure along the two streamers in a twin streamer configuration:

$$v_z(\omega, k_x, k_y, z_1) = \tag{A44}$$
$$\frac{ik_z}{\rho\omega}\cot(k_z \Delta z) p(\omega, k_x, k_y, z_1) - \frac{ik_z}{\rho\omega \sin(k_z \Delta z)} p(\omega, k_x, k_y, z_2).$$

Equation (A44) closely resembles a corresponding expression for single streamer de-ghosting obtained by L. Amundsen et al.:

$$v_z(\omega, k_x, k_y, z) = -\frac{ik_z}{\rho\omega}\cot(k_z \Delta z) p(\omega, k_x, k_y, z). \tag{A45}$$

Therefore, all that remains is to establish compact filters for the second term in equation (A44), which we denote as:

$$G^{(2)} = -\frac{ik_z}{\rho\omega \sin(k_z \Delta z)}. \tag{A46}$$

According to Raade and Westergren in Beta—Mathematics handbook: Studentlitteratur, Lund, Sweden (1988), equation (A46) can be expanded as:

$$G^{(2)} = -\frac{i}{\rho\omega\Delta z} \sum_{n=0}^{\infty} (-1)^{n-1} \frac{2^{2n}-2}{(2n)!} B_{2n}(k_z\Delta z)^{2n}, \tag{A47}$$

where $B_n$ is the nth Bernoulli number and $-\pi < k_z\Delta z < \pi$. Making use of the Binomial expansion to expand factors $(k_z\Delta z)^2$ as outlined in Amundsen et al. (2003), equation $$G^{(2)} = \tag{A48}$$

$$-\frac{i}{\rho\omega\Delta z}\sum_{n=0}^{\infty}(-1)^{n-1}\frac{2^{2n}-2}{(2n)!}B_{2n}(k\Delta z)^{2n}\sum_{m=0}^{n}(-1)^m\binom{n}{m}k^{-2m}\kappa^{2m},$$

where $k=\omega/c$ and $c$ is the speed of sound in water. Interchanging sums using (using $$\sum_{n=0}^{\infty}a_n\sum_{m=0}^{n}b_{nm}c_m = \sum_{m=0}^{\infty}c_m\sum_{n=m}^{\infty}a_n b_{nm})\text{ yields:}$$

$$G^{(2)} = -\frac{i}{\rho\omega\Delta z}\sum_{m=0}^{\infty}(-1)^m k^{-2m}\kappa^{2m}\sum_{n=m}^{\infty}A_{nm}(k\Delta z)^{2n}, \tag{A49}$$

where $$A_{nm} = (-1)^{n-1}\frac{2^{2n}-2}{(2n)!}B_{2n}\binom{n}{m}. \tag{A50}$$

By introducing $$F_m = k^{-2m}\sum_{n=m}^{\infty}A_{nm}(k\Delta z)^{2n}$$

we can rewrite equation (A44) as $$v_z(\omega,k_x,k_y,z_1) = \frac{i}{\rho\omega\Delta z}\sum_{m=0}^{\infty}(-1)^m F_m^{(1)}\kappa^{2m}p(\omega,k_x,k_y,z_1) - \tag{A51}$$

$$\frac{i}{\rho\omega\Delta z}\sum_{m=0}^{\infty}(-1)^m F_m^{(2)}\kappa^{2m}p(\omega,k_x,k_y,z_2).$$

The lowest order coefficients in the first expansion are given in Amundsen et al. (2003):

$$F_0^{(1)} = k\Delta z \cot(k\Delta z), \tag{A52}$$

and $$F_1^{(1)} = \frac{\Delta z}{2k}\frac{d}{d(k\Delta z)}k\Delta z \cot(k\Delta z). \tag{A53}$$

The two lowest order coefficients in the second expansion can be identified to be:

$$F_0^{(2)} = \frac{k\Delta z}{\sin(k\Delta z)}, \tag{A54}$$

and $$F_1^{(2)} = \frac{\Delta z}{k}\frac{\sin(k\Delta z)-k\Delta z\cos(k\Delta z)}{\sin^2(k\Delta z)}. \tag{A55}$$

By only keeping the lowest order terms [equations (A52) and (A54)] in the series expansions in equation (A51) results in an expression that is valid for all streamer separations and that is exact for vertically incident waves only. This is equivalent to the known as the "shift & sum" technique used in the early days of twin-streamer deghosting.

The results can be significantly improved by keeping higher order terms in the series expansions. The next higher order approximation will include 4 terms as given by equations (A52)-(A55). This can be implemented with a 3-point running spatial filter.

What is claimed is:

1. A method of determining a vertical component of particle velocity from seismic data acquired using at least one receiver disposed within a water column, the method comprising:

determining the vertical component of particle velocity from the pressure at a first location and a second location, the first location being the location of a first receiver and being vertically beneath the second location and the second location being below the surface of the water column and being the location of a second receiver, using an operator suitable for seismic data acquired at a vertical separation between the first and second locations of up to at least 0.4 times the minimum wavelength of seismic energy emitted by a seismic source used to acquire the seismic data, wherein the operator is a spatially compact operator and includes only finite powers of the wavenumber k and corresponding orders of spatial derivatives in the space-time domain, said operator being stored in a memory for use in the processing of seismic data, and wherein the vertical component of particle velocity at the second location is determined from pressure acquired at the second receiver and from pressure acquired at the first receiver from the following equation or from an equation derived therefrom:

$$v_z(\omega,k_x,k_y,z_1) = \frac{i}{\rho\omega\Delta z}\sum_{m=0}^{\infty}(-1)^m F_m^{(1)}\kappa^{2m}p(\omega,k_x,k_y,z_1) -$$

$$\frac{i}{\rho\omega\Delta z}\sum_{m=0}^{\infty}(-1)^m F_m^{(2)}\kappa^{2m}p(\omega,k_x,k_y,z_2)$$

where $F_m = k^{-2m}\sum_{n=m}^{\infty}A_{nm}(k\Delta z)^{2n}$, $A_{nm} = (-1)^{n-1}\frac{2^{2n}-2}{(2n)!}B_{2n}\binom{n}{m}$, $B_n$ is the $n^{th}$ Bernoulli number, and $\kappa^2 = k_x^2 + k_y^2$.

2. A method as claimed in claim 1 wherein each summation over m is carried out over m=0 to m=1.

3. A method as claimed in claim 1 and comprising the further step of processing the seismic data using the vertical component of the particle velocity.

4. A method as claimed in claim 3 and comprising processing the seismic data so as to determine at least one of an up-going component and a down-going component of the seismic data.

5. A method as claimed in claim 3 and comprising processing the seismic data using the vertical component of the particle velocity thereby to attenuate effects in the processed data of seismic energy reflected and/or scattered at the free-surface of the water column.

6. A method as claimed in claim 3 and comprising processing the seismic data using the vertical component of the particle velocity thereby to obtain information about the signature of the source of seismic energy.

7. A method as claimed in claim 1 wherein the seismic data comprise pressure and particle velocity data, and wherein the method further comprises comparing the vertical component of the particle velocity determined from the acquired pressure with the measured values of the particle velocity.

8. A method as claimed in claim 1 wherein the seismic data comprises pressure and particle velocity data, and wherein the method further comprises the step of determining the depth of the seismic receiver within the water column from the measured vertical component of the particle velocity and the vertical component of the particle velocity determined from the pressure.

9. A method of acquiring marine seismic data comprising the steps of:
   actuating an array of one or more seismic sources to emit seismic energy;
   acquiring seismic data at one or more receivers disposed within a water column, the seismic data including at least pressure data; and
   processing the acquired pressure data according to a method as defined in claim 1.

10. An apparatus for determining a vertical component of particle velocity from seismic data acquired using at least one receiver disposed within a water column, the apparatus having means for determining the vertical component of particle velocity from the pressure at a first location and a second location, the first location being the location of a first receiver and being vertically beneath the second location, using an operator suitable for seismic data acquired at a vertical separation between the first and second locations of up to at least 0.4 times the minimum wavelength of seismic energy emitted by a seismic source used to acquire the seismic data, wherein the operator is a spatially compact operator and includes only finite powers of the wavenumber k and corresponding orders of spatial derivatives in the space-time domain, and wherein the apparatus includes a storage to store the operator for use in processing seismic data and the apparatus is adapted to determine the vertical component of particle velocity from the pressure acquired at the first and second locations, the second location being within the water column and being the location of a second receiver, and wherein the vertical component of particle velocity at the second location is determined from pressure acquired at the second receiver and from pressure acquired from the following equation or from an equation derived therefrom:

$$v_z(\omega, k_x, k_y, z_1) = \frac{i}{\rho\omega\Delta z}\sum_{m=0}^{\infty}(-1)^m F_m^{(1)}\kappa^{2m}p(\omega, k_x, k_y, z_1) - \frac{i}{\rho\omega\Delta z}\sum_{m=0}^{\infty}(-1)^m F_m^{(2)}\kappa^{2m}p(\omega, k_x, k_y, z_2)$$

$$\text{where } F_m = k^{-2m}\sum_{n=m}^{\infty}A_{nm}(k\Delta z)^{2n}, \quad A_{nm} = (-1)^{n-1}\frac{2^{2n}-2}{(2n)!}B_{2n}\binom{n}{m},$$

$B_n$ is the $n^{th}$ Bernoulli number, and $\kappa^2 = k_x^2 + k_y^2$.

11. An apparatus as claimed in claim 10 and adapted to perform each summation over m over the range m=0 to m=1.

12. An apparatus as claimed in claim 10 and further adapted to process the seismic data using the vertical component of the particle velocity.

13. An apparatus as claimed in claim 12 and adapted to process the seismic data so as to determine at least one of an up-going component and a down-going component of the seismic data.

14. An apparatus as claimed in claim 12 and adapted to process the seismic data using the vertical component of the particle velocity thereby to attenuate effects in the processed data of seismic energy reflected and/or scattered at the free-surface of the water column.

15. An apparatus as claimed in claim 12 and adapted to process the seismic data using the vertical component of the particle velocity thereby to obtain information about the signature of the source of seismic energy.

16. An apparatus as claimed in claim 10, and comprising a programmable data processor.

17. A storage medium containing a program for the data processor of an apparatus as defined in claim 16.

* * * * *